US007809905B2

(12) United States Patent
Maruyama et al.

(10) Patent No.: US 7,809,905 B2
(45) Date of Patent: Oct. 5, 2010

(54) DATA MIGRATING METHOD TAKING END TIME INTO CONSIDERATION

(75) Inventors: Tetsuya Maruyama, Kawasaki (JP); Yuichi Taguchi, Sagamihara (JP); Masayasu Asano, Yokohama (JP); Masayuki Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 456 days.

(21) Appl. No.: 11/968,236

(22) Filed: Jan. 2, 2008

(65) Prior Publication Data

US 2008/0201542 A1 Aug. 21, 2008

(30) Foreign Application Priority Data

Feb. 16, 2007 (JP) ............................. 2007-036179

(51) Int. Cl.
*G06F 12/16* (2006.01)

(52) U.S. Cl. ........................ 711/161; 711/162; 711/114

(58) Field of Classification Search ........................ None
See application file for complete search history.

(56) References Cited

U.S. PATENT DOCUMENTS

| | | | | |
|---|---|---|---|---|
| 6,052,797 | A | * | 4/2000 | Ofek et al. .................. 714/6 |
| 7,080,221 | B1 | * | 7/2006 | Todd et al. .................. 711/161 |
| 7,415,591 | B1 | * | 8/2008 | Todd et al. .................. 711/170 |
| 2005/0154821 | A1 | | 7/2005 | Furuhashi et al. |
| 2006/0212671 | A1 | * | 9/2006 | Todd .......................... 711/165 |
| 2007/0061513 | A1 | * | 3/2007 | Tsumagari et al. .......... 711/114 |

FOREIGN PATENT DOCUMENTS

JP 2005-196625 7/2005

\* cited by examiner

*Primary Examiner*—Than Nguyen
(74) *Attorney, Agent, or Firm*—Brundidge & Stanger, P.C.

(57) ABSTRACT

There is provided a data migrating method including the steps of: calculating, in a case where data stored in a volume is migrated to another volume, a required period of time for migrating the data based on a size of data to be migrated and volume configuration information on the volume in which the migrated data is stored and the volume to which the data is to be migrated; determining a start time at which the data migration starts to generate a volume migration plan; setting a priority of the generated volume migration plan; prioritizing, in a case where a periods of time during which the generated volume migration plan is executed and a period of time during which an existing volume migration plan is executed are overlapped with each other, and changing the start time of at least one of those volume migration plans having a lower priority.

20 Claims, 19 Drawing Sheets

|  511  |  512  |  513  |  514  |  515  | 241 |
|---|---|---|---|---|---|
| VOL # | VDEV# | RAID LEVEL | DISK TYPE | CAPACITY | |
| 1 | 001 | RAID1 | FC | 40GB | |
| 2 | 002 | RAID1 | FC | 40GB | |
| 3 | 003 | RAID1 | FC | 40GB | |
| 20 | 010 | RAID1 | FC | 40GB | |
| 21 | 011 | RAID1 | FC | 40GB | |

*FIG. 5*

| 611 | 612 | 613 | 614 | 341 |
|---|---|---|---|---|
| VOL # | EXTERNAL PORT # | IP ADDRESS | EXTERNAL VOL # | |
| 101 | 11 | 10.209.xxx.xxx | 01 | |
| 102 | 11 | 10.209.xxx.xxx | 02 | |
| 104 | 12 | 200.51.xxx.yyy | 01 | |

*FIG. 6*

| 711 | 712 | 713 | 441 |
|---|---|---|---|
| ID | STORAGE NAME | DEVICE TYPE | |
| 001 | STORAGE -A | HIGH PERFORMANCE | |
| 002 | STORAGE -B | LOW PERFORMANCE | |
| 003 | STORAGE -C | LOW PERFORMANCE | |

FIG. 7

| 811 | 812 | 813 | 814 | 442 |
|---|---|---|---|---|
| MG ID | BELONGING VOL # | MIGRATION SOURCE TIER | MIGRATION DESTINATION TIER | |
| 001 | 001, 002, 003 | TIER 2 | TIER 1 | |
| 002 | 007, 008 | TIER 2 | TIER 3 | |
| 003 | 009 | TIER 1 | — | |

FIG. 8

| | 911 | 912 | 913 | 914 | 915 | 916 | 443 |
|---|---|---|---|---|---|---|---|
| | MG ID | PRIORITY | SCHEDULED START TIME | SCHEDULED END TIME | DESIGNATED END TIME | EXECUTION STATUS | |
| | 001 | 2 | 12/10 10:10 | 12/10 10:40 | 12/10 12:00 | MIGRATING | |
| | 002 | 5 | 12/10 11:00 | 12/10 11:30 | 12/10 13:00 | UNPROCESSED | |
| | 003 | 6 | 12/10 9:00 | 12/10 10:00 | 12/10 13:00 | SUSPENDED | |

*FIG. 9*

| 1011 | 1012 | 1013 | TIER CONDITION | | | | | 444 |
|---|---|---|---|---|---|---|---|---|
| TIER ID | TIER NAME | TIER ORDER | CAPACITY | DEVICE ID | DEVICE TYPE | RAID LEVEL | DISK TYPE | |
| 001 | TIER 1 | 1 | ≦50GB | 001 | HIGH PERFORMANCE | RAID1 | FC | |
| 002 | TIER 2 | 2 | ≦50GB | 002 | LOW PERFORMANCE | RAID1 | FC | |
| 003 | TIER 3 | 3 | ≦50GB | 002 | LOW PERFORMANCE | RAID5 | - | |
| | | | 1014 | 1015 | 1016 | 1017 | 1018 | |

*FIG. 10*

| 1111 | 1112 | 1113 | 1114 | 1115 | 1116 | 1117 445 |
|---|---|---|---|---|---|---|
| VOLUME ID | MG ID | STORAGE ID | VOL # | RAID LEVEL | DISK TYPE | CAPACITY |
| 001 | 001 | 002 | 1 | RAID1 | FC | 40GB |
| 002 | 001 | 002 | 2 | RAID1 | FC | 40GB |
| 003 | 001 | 002 | 3 | RAID1 | FC | 40GB |
| 007 | 002 | 002 | 20 | RAID1 | FC | 40GB |
| 008 | 002 | 002 | 21 | RAID1 | FC | 40GB |

*FIG. 11*

| 1211 | 1212 | 1213 | 1214 | 1215 446 |
|---|---|---|---|---|
| MG ID | MIGRATION SOURCE VOL | MIGRATION DESTINATION VOL | CAPACITY | PROGRESS |
| 001 | 1 | 31 | 40GB | MIGRATING |
| 001 | 2 | 32 | 40GB | UNPROCESSED |
| 001 | 3 | 33 | 40GB | UNPROCESSED |

*FIG. 12*

| CONDITION # | MIGRATION CONDITION | PRIORITY | CONDITION ORDER |
|---|---|---|---|
| 1 | CAPACITY OF MIGRATION SOURCE STORAGE TIER IS 25% OR LOWER AT THE TIME OF MIGRATION | 1 | 2 |
| 2 | DATA MIGRATION FROM TIER2 TO TIER1 | 2 | 3 |
| 3 | DATA MIGRATION FROM TIER3 TO TIER1 | 3 | 3 |
| 4 | DATA MIGRATION FROM TIER3 TO TIER2 | 4 | 3 |
| 5 | DATA MIGRATION FROM TIER2 TO TIER3 | 5 | 3 |
| 6 | DATA MIGRATION FROM TIER1 TO TIER2 | 6 | 3 |
| 7 | DATA MIGRATION FROM TIER1 TO TIER3 | 7 | 3 |
| 8 | COMPLETE DELETION OF DATA IN MIGRATION SOURCE VOL | 8 | 1 |

*FIG. 13*

MIGRATION GROUP

| SELECT | MG ID | BELONGING VOL # | MIGRATION SOURCE TIER |
|---|---|---|---|
| ● | 001 | 001,002,003 | TIER 2 |
| ○ | 002 | 007,008 | TIER 2 |
| ○ | 003 | 009 | TIER 1 |
| 2211 | 2212 | 2213 | 2214 |

MIGRATION DESTINATION STORAGE TIER

| SELECT | TIER NAME | TIER CONDITION | | | | |
|---|---|---|---|---|---|---|
| | | CAPACITY | DEVICE ID | DEVICE TYPE | RAID LEVEL | DISK TYPE |
| ● | TIER 1 | ≦50GB | 001 | HIGH PERFORMANCE | RAID1 | FC |
| ○ | TIER 2 | ≦50GB | 002 | LOW PERFORMANCE | — | FC |
| ○ | TIER 3 | ≦50GB | 002 | LOW PERFORMANCE | RAID5 | SATA |
| 2221 | 2222 | 2223 | 2224 | 2225 | 2226 | 2227 |

DESIGNATED END TIME 2231

12/10/2006 12:00

2241 EXECUTE  2242 CANCEL

FIG. 19

MIGRATION PLAN TABLE BEFORE PRODUCTION

| MGID | PRIORITY | ESTIMATED START TIME | ESTIMATED END TIME | DESIGNATED END TIME | EXECUTION STATUS |
|---|---|---|---|---|---|
| 101 | 2 | 12/10 9:30 | 12/10 10:00 | 12/10 12:00 | UNPROCESSED |

911   912   913   914   915   916

MIGRATION PLAN TABLE AFTER PRODUCTION

| MGID | PRIORITY | ESTIMATED START TIME | ESTIMATED END TIME | DESIGNATED END TIME | EXECUTION STATUS |
|---|---|---|---|---|---|
| 101 | 2 | 12/10 9:00 | 12/10 9:30 | 12/10 12:00 | MIGRATING |
| 102 | 5 | 12/10 9:30 | 12/10 10:30 | 12/10 12:00 | UNPROCESSED |

911   912   913   914   915   916

MIGRATION PLAN TABLE BEFORE EXECUTION OF MGID 202

| MGID | PRIORITY | ESTIMATED START TIME | ESTIMATED END TIME | DESIGNATED END TIME | EXECUTION STATUS |
|------|----------|---------------------|--------------------|--------------------|-----------------|
| 201  | 6        | 12/10 9:00          | 12/10 10:00        | 12/10 12:00        | MIGRATING       |
| 202  | 3        | 12/10 10:00         | 12/10 11:00        | 12/10 13:00        | UNPROCESSED     |

911　912　913　914　915　916

MIGRATION PLAN TABLE AFTER EXECUTION OF MGID 202

| MGID | PRIORITY | ESTIMATED START TIME | ESTIMATED END TIME | DESIGNATED END TIME | EXECUTION STATUS |
|------|----------|---------------------|--------------------|--------------------|-----------------|
| 201  | 6        | 12/10 9:00          | 12/10 10:00        | 12/10 12:00        | SUSPENDED       |
| 202  | 3        | 12/10 10:00         | 12/10 11:00        | 12/10 13:00        | MIGRATING       |

911　912　913　914　915　916

DATA MIGRATING METHOD TAKING END TIME INTO CONSIDERATION

CLAIM OF PRIORITY

The present application claims priority from Japanese patent application JP 2007-036179 filed on Feb. 16, 2007, the content of which is hereby incorporated by reference into this application.

BACKGROUND

This invention relates to a computer system including a storage system for storing data of a large volume, and more particularly to a technique for migrating data stored in the storage system.

DESCRIPTION OF THE RELATED ART

Recently, a volume of data processed by a computer system in a company, a local government, a public office, or a financial institution is increasing year by year. Under the circumstances, a new storage system (storage device) is added, or data is migrated from an existing storage system to another existing storage system, as a countermeasure against an increase in the volume of data.

Also, the computer system is complicated in configuration when a plurality of storage systems are added with an increase in volume of data to be managed. As a technique for solving the above-mentioned problem, there has been proposed a technique of virtualization of computer systems. The virtualization of computer systems means a technique of virtualizing a plurality of storage systems that are connected to each other on a network by logically recognizing them as one computer system. Because operation management can be centralized by virtualizing the computer system, it is possible to reduce management costs.

Also, with the application of the virtualization technique of computer systems, the volumes (logical or physical storage areas serving as units of data storage) of the computer systems can be classified into a plurality of storage tiers on the basis of characteristics such as performance or type. For example, in a technique disclosed in JP 2005-196625 A, access frequency of data stored in each volume is regularly monitored to realize an appropriate arrangement of storage systems according to function characteristics corresponding to the access frequency.

SUMMARY

However, in the technique disclosed in JP 2005-196625 A, in a case where a plurality of processes are required to be executed at the same time, the priority order of the respective processes is not considered. For that reason, in a case where a certain migrating process is executed, even when a migrating process whose deadline approaches is to be executed, it is impossible to execute a new migrating process until the migrating process in execution has been completed. Accordingly, there is a fear that the new migrating process cannot be executed by its deadline, and it causes a problem.

This invention has been made in view of the above-mentioned problems, and therefore it is an object of this invention to give a priority to each migrating process and reschedule on the basis of the priority to complete the execution of the data migration by the deadline in the case where a plurality of migrating process requests are executed.

A representative aspect of this invention is as follows. That is, there is provided a computer system, comprising: a storage system; a host computer that is coupled to the storage system via a network; and a storage management server that can access to the storage system and the host computer, wherein the storage system comprises a first interface that is coupled to the network, a first processor that is coupled to the first interface, a first memory that is coupled to the first processor, and a storage device that stores data that is read or written by the host computer, and provides at least one storage area of the storage device for the host computer as at least one volume, wherein the storage management server comprises a second interface that is coupled to the storage system, a second processor that is coupled to the second interface, and a second memory that is coupled to the second processor, wherein the second memory stores configuration information of the volume, and wherein the second processor executes a volume migrating process for migrating data stored in the volume to another volume, in which the second processor: calculates a required period of time for migrating the data based on a size of data to be migrated, volume configuration information of a first volume in which the data to be migrated is stored, and volume configuration information of a second volume that is a volume to which the data is migrated; generate a volume migration plan by determining a start time at which the data migration starts based on the calculated required period of time and an input end time; sets a priority of the generated volume migration plan; and changes, in a case where a period of time during which the produced volume migration plan is executed and a period of time during which an existing volume migration plan is executed are overlapped with each other, based on a result of comparing a priority of the generated volume, migration plan with a priority of the existing volume migration plan, the start time of at least one of the generated volume migration plan and the existing volume migration plan, in accordance with the priority of the volume migration plan which has a higher priority of the generated volume migration plan and the existing volume migration plan.

According to this embodiment of this invention, execution of a volume migrating process higher in priority is started prior to execution of a volume migrating process lower in priority, thereby enabling the migrating process of the volume higher in priority to be completed by its designated time.

BRIEF DESCRIPTION OF THE DRAWINGS

The present invention can be appreciated by the description which follows in conjunction with the following figures, wherein:

FIG. 5 is a diagram showing an example of the data configuration of a storage volume table according to the embodiment of this invention;

FIG. 6 is a diagram showing an example of a external volume table according to the embodiment of this invention;

FIG. 7 is a diagram showing an example of a storage table according to the embodiment of this invention;

FIG. 8 is a diagram showing an example of a migration group table according to the embodiment of this invention;

FIG. 9 is a diagram showing an example of a migration plan table according to the embodiment of this invention;

FIG. 10 is a diagram showing an example of a storage tier table according to the embodiment of this invention;

FIG. 11 is a diagram showing an example of a volume table according to the embodiment of this invention;

FIG. 12 is a diagram showing an example of a volume relation table according to the embodiment of this invention;

FIG. 13 is a diagram showing an example of a priority table according to the embodiment of this invention;

FIG. 19 shows a screen for registering the migration plan according to the embodiment of this invention;

DETAILED DESCRIPTION OF THE PREFERRED EMBODIMENTS

Now, a description will be given of an embodiment of this invention with reference to the accompanying drawings.

First, a description will be given of a specific configuration of a computer system 100 according to the embodiment of this invention with reference to FIG. 1 to FIG. 4.

Figure 1:
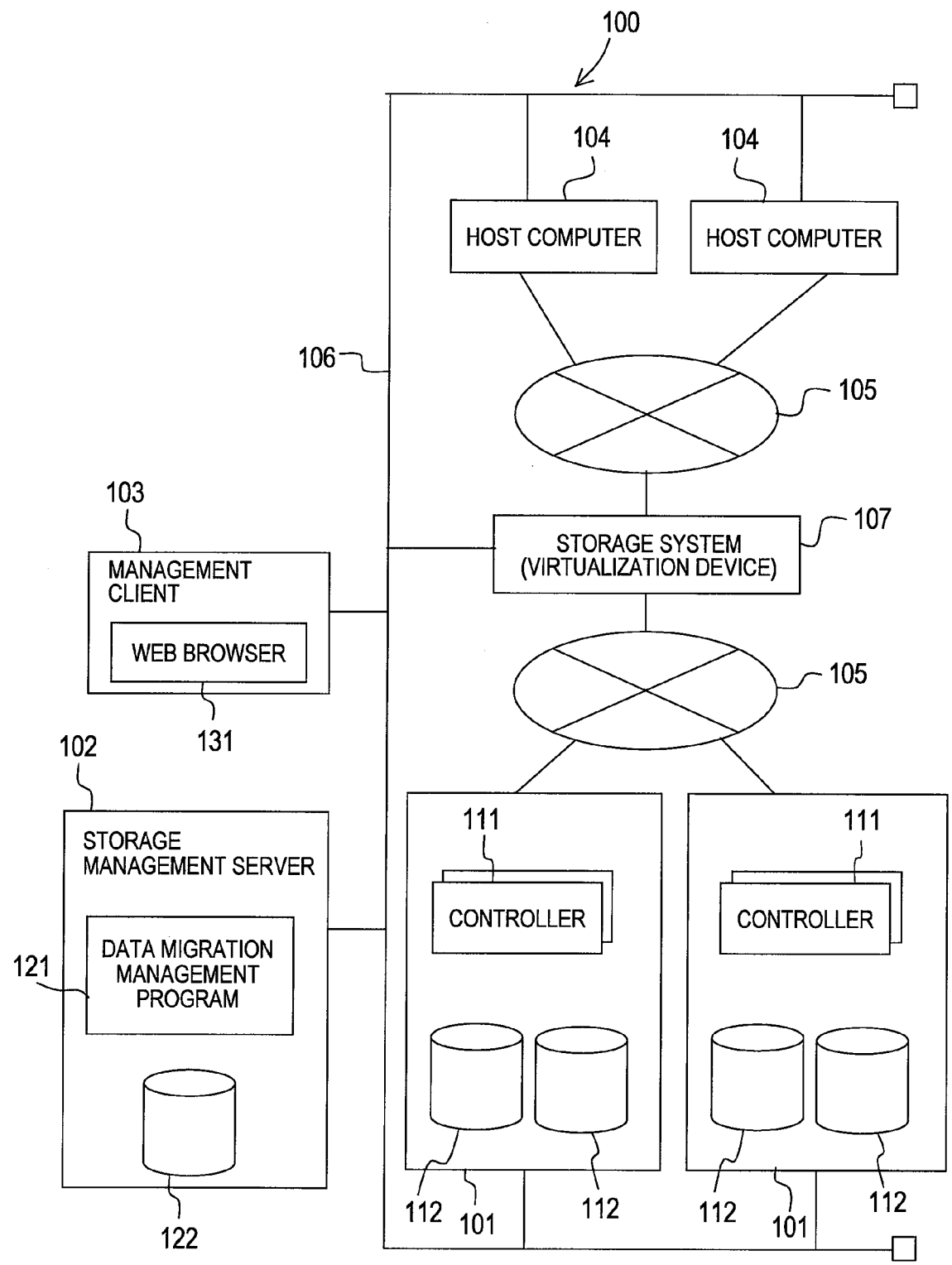
FIG. 1 is a diagram showing an example of a hardware configuration of a computer system according to an embodiment of this invention.

FIG. 1 is a diagram showing an example of a hardware configuration of the computer system 100 according to the embodiment of this invention.

The computer system 100 includes one or more storage systems 101, a storage management server 102, a management client 103, one or more host computers 104, storage networks 105, a management network 106, and a virtualization device 107.

Each of the host computers 104 executes various business processings (for example, a database process, a web application process, and a streaming process) by using storage resources that are supplied by the storage systems 101 and the virtualization device 107. Each of the host computers 104 is formed of, for example, a workstation system, a main frame computer, or a personal computer. Each of the host computers 104 is connected to the plurality of storage systems 101 via the virtualization device 107, to thereby recognize the storage resources that are supplied by the respective storage systems 101 as one storage resource logically.

The virtualization device 107 is formed of, for example, a virtualization switch, an intelligent switch, or a virtualization dedicated device. The virtualization device 107 may be formed of a storage system that provides a virtualization function.

Each of the storage systems 101 has one or more controllers 111 and a plurality of storage devices 112.

Each of the controllers 111 controls the plurality of storage devices 112 as a redundant arrays of inexpensive disks (RAID) configuration corresponding to RAID levels (for example, 0, 1 and 5). In the RAID configuration, the plurality of storage devices 112 are managed as one RAID group. The RAID group is configured by grouping four or eight storage devices 112 as one set. In other words, the storage areas that are supplied by the respective storage devices 112 are assembled to configure one RAID group. In the RAID group, one or more logical volumes serving as access units from the host computer 104 are defined.

Each of the storage devices 112 is a physical device that actually stores data therein. More specifically, the physical device may be a fibre channel (FC) disk drive, a serial advanced technology attachment (SATA) disk drive, a parallel advanced technology attachment (PATA) disk drive, a serial attached SCSI (SAS) disk drive, a fibre attached technology adapted (FATA) disk drive, or a small computer system interface (SCSI) disk drive. As the storage device 112, a semiconductor memory such as a flash memory can be employed together.

The management network 106 is connected to the one or more host computers 104, the one or more storage systems 101, the virtualization device 107, the storage management server 102, and the management client 103, so as to be used for transmitting or receiving management information.

The management client 103 is a computer for maintaining and managing the computer system 100. A user inputs a command for storage management via a web browser 131 that is installed in the management client 103, to thereby maintain and manage the computer system 100. The command for storage management may be, for example, a command for increasing or decreasing the number of storage devices 112, a command for instructing a change in RAID configuration, or a command for setting communication paths between the host computers 104 and the storage systems 101.

The storage management server 102 receives various commands for storage management from the management client 103, and maintains and manages the computer system 100. The storage management server 102 has a data migration management program 121. The data migration management program 121 executes a process for migrating the volumes between the storage tiers. The data migration management program 121 is a generic term of the respective programs for migrating the volumes, and will be described in detail with reference to FIG. 4. Also, the storage management server 102 has a storage device 122 for storing information such as the configuration information of the computer system 100.

Figure 2:
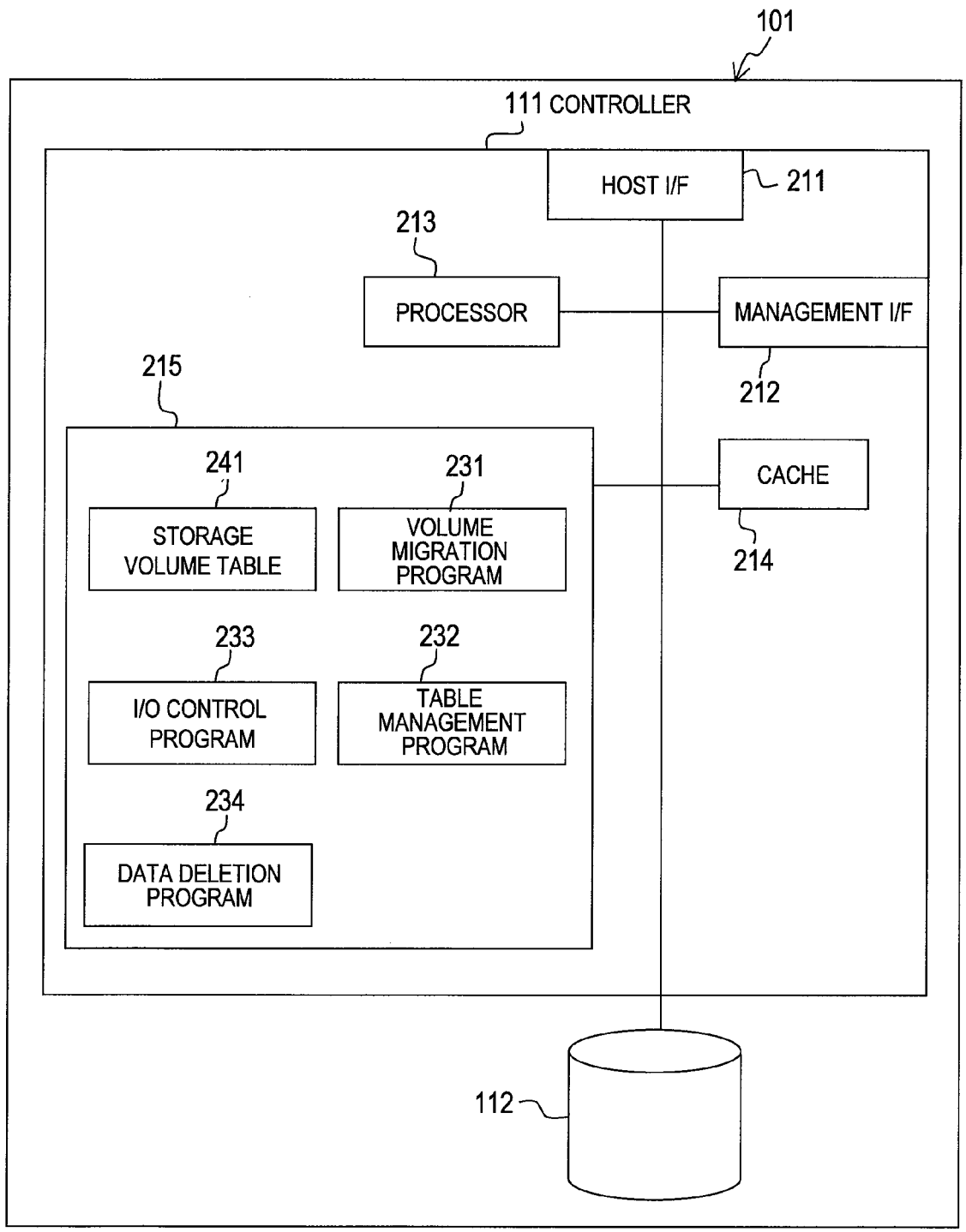
FIG. 2 is a diagram showing an example of the configuration of a storage system according to the embodiment of this invention.

FIG. 2 is a diagram showing an example of the configuration of the storage system 101 according to the embodiment of this invention. The storage system 101 includes the controller 111 and the storage device 112.

The controller 111 includes a host interface (I/F) 211, a management interface (I/F) 212, a processor 213, a cache 214, and a memory 215.

The host interface 211 is a network interface for connecting to the host computers 104 through the storage network 105.

The management interface 212 is a network interface for connecting to the storage management servers 102 and the management client 103 through the management network 106.

The processor 213 receives a data input/output request from the host computer 104, and controls the input and output of data with respect to the storage device 112. The processor 213 is, for example, a central processing unit (CPU). The cache 214 temporarily stores the data that is input to or output from the storage device 112.

The memory 215 stores information necessary for various control microprograms and processes. The memory 215 stores a volume migration program 231, a table management program 232, an I/O control program 233, a data deletion program 234, and a storage volume table 241 therein.

The volume migration program 231 is a program for changing a correspondence between the volumes and the storage device 112. The host computer 104 identifies the volumes by using identifiers (ID). Also, the host computer 104 recognizes the logical position of the storage area (logical address) on the volume from/to which data is read/written, but does not recognize the physical position of the storage area (physical address) of the storage device 112. The volume migration means to change the logical position of the storage area on the volume which is recognized by the host computer 104. The volume migration program 231 migrates a volume that belongs to a certain storage tier (described later with reference to FIG. 10) to another storage tier.

The table management program 232 is a program for reading information that is stored in the storage volume table 241 or writing information that is to be stored therein.

The I/O control program 233 is a program for controlling data input to or output from the storage device 112 in response to an I/O request from the host computer 104.

The data deletion program 234 is a program for deleting the data stored in the storage device 112. The deletion of data is a process for preventing the contents of the storage device in which the data has been stored from being read by writing data (for example, data represented by "1" and "0" placed at random, data represented by merely "0", and data represented by merely "1") in the physical area of the storage device 112 in which the data has been stored, once or a plurality of times.

The storage volume table 241 stores information indicative of a correspondence between the volumes and the storage device 112, and information related to the volume characteristics therein. The details of the storage volume table will be described with reference to FIG. 5.

Figure 3:
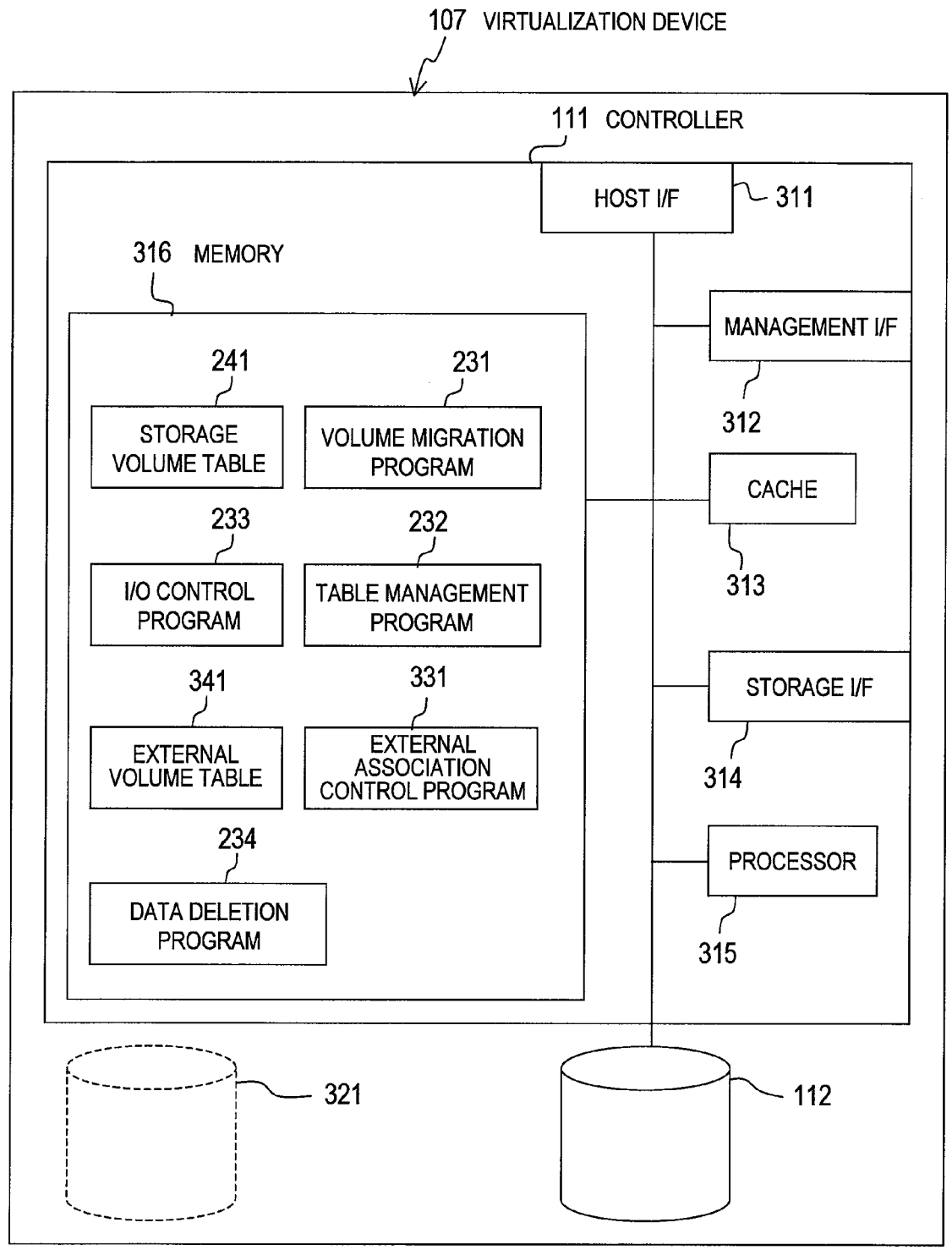
FIG. 3 is a diagram showing an example of the hardware configuration of a virtualization device according to the embodiment of this invention.

FIG. 3 is a diagram showing an example of the hardware configuration of the virtualization device 107 according to the embodiment of this invention.

The virtualization device 107 includes a host interface (I/F) 311, a storage interface (I/F) 314, a processor 315, a memory 316, a cache 313, a storage device 112, and a management interface (I/F) 312. It is unnecessary that the storage device 112 be installed in the virtualization device 107.

The host interface 311 is a network interface for connecting to the host computers 104 through the storage network 105.

The storage interface 314 is a network interface for connecting to the storage system 101 through the storage network 105. The number of storage interfaces 314 is one in FIG. 3, but it is desirable that the storage interface 314 be disposed in each of the storage systems 101.

The processor 315 executes the program stored in the memory 316, to thereby execute a process of virtualizing the storage resources (storage devices 112) that are supplied by the respective storage systems 101 by logically recognizing them as one storage resource.

The memory 316 stores information necessary for various control microprograms and processes therein. The memory 316 stores a storage volume table 241, an external volume table 341 (volume information), a volume migration program 231, a table management program 232, an I/O control program 233, a data deletion program 234, and an external association control program 331 therein.

The virtualization device 107 has one or more virtual volumes 321. Each of the virtual volumes 321 is a volume to which the volume that is supplied by the storage system 101 is virtually allocated. Hereinafter, the volume that is supplied by the storage system 101 is called "external volume". The address space (an area where the address is mapped) of the virtual volume 321 is mapped in the address space of the external volume.

The host computer 104 recognizes the virtual volume 321 as the storage area of the storage system 101, and issues an I/O request with respect to the virtual volume 321. Upon receiving the I/O request from the host computer 104, the virtualization device 107 executes address conversion between the virtual volume 321 and the external volume. Then, the virtualization device 107 transfers the I/O request from the host computer 104 to the storage system 101, and accesses to the external volume. The respective external volumes that are supplied by the plurality of storage systems 101 are allocated to the virtual volumes 321. In this way, the virtualization device 107 virtualizes the storage resources of the plurality of storage systems 101 by logically recognizing them as one storage resource.

The external association control program 331 is a program for controlling an external association between the virtualization device 107 and the storage system 101. More specifically, the external association control program 331 executes an address conversion between the virtual volume 321 and the external volume and a command transfer to the storage system 101.

The external volume table 341 stores information indicative of the correspondence between the virtual volume 321 and the external volume therein. The details of the external volume table 341 will be described with reference to FIG. 6.

The cache 313 temporarily stores data that is input to or output from the storage device 112 and the virtual volume 321 therein.

The management interface 312 is a network interface for connecting to the storage management server 102 and the management client 103 through the management network 106.

Figure 4:
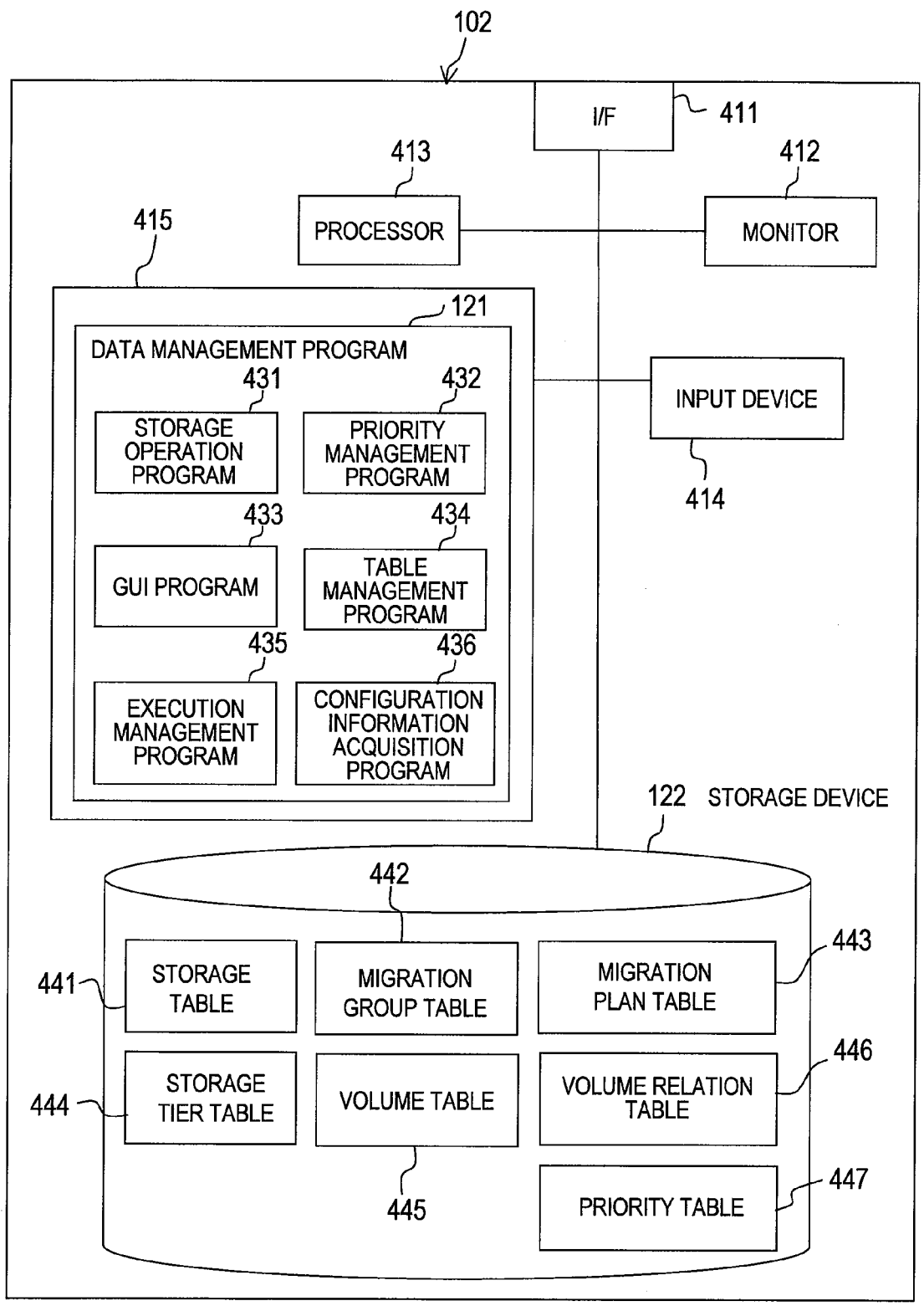
FIG. 4 is a diagram showing an example of the configuration of a storage management server according to the embodiment of this invention.

FIG. 4 is a diagram showing an example of the configuration of the storage management server 102 according to the embodiment of this invention.

The storage management server 102 includes an interface (I/F) 411, a monitor 412, a processor 413, an input device 414, a memory 415, and the storage device 122.

The interface 411 is a network interface for connecting to the management network 106. More specifically, the interface 411 can be formed of a LAN adapter. The storage management server 102 acquires the volume configuration information of the storage device 112 from the storage system 101 through the interface 411, and transmits an instruction of the volume migration to the storage system 101.

The monitor 412 is a display device for supplying a screen for storage management to a user under graphical user interface (GUI) environments. The input device 414 is a device for inputting a storage management command such as a keyboard or a mouse. The monitor 412 and the input device 414 may not be disposed in the storage management server 102.

The processor 413 executes the program stored in the memory 415 to maintain and manage the computer system 100. In addition, the processor 413 executes the data migration management program 121 to execute a process of migrating the volumes between the storage tiers.

The memory 415 stores the data migration management program 121 therein. Specifically, the data migration management program 121 includes a storage operation program 431, a priority management program 432, a GUI program 433, a table management program 434, an execution management program 435, and a configuration information acquisition program 436.

The storage operation program 431 is a program for instructing the execution of the data migrating process and the data deleting process to the storage system 101 and the virtualization device 107. An object to which the data migrating process is to be instructed is as follows.

The processor 413 instructs the data migration to the storage system 101 to which the migration source volume and the migration destination volume belong in the case where the migration source volume and the migration destination volume belong to the same storage system 101. Also, the processor 413 may instruct the data migration to the virtualization device 107 in the case where the migration source volume and the migration destination volume belong to the same storage system 101, and are connected to the virtualization device 107.

In addition, in the case where the migration source volume and the migration destination volume belong to the different storage systems 101, the processor 413 instructs the data migration to the virtualization device 107. Also, in the case where the migration source volume or the migration destination volume belongs to the virtualization device 107, the processor 413 instructs the data migration to the virtualization device 107.

On the other hand, the processor 413 executes the storage operation program 431, to thereby instruct the execution of the data deleting process to the virtualization device 107 or the storage system 101 to which the migration source volume belongs.

The priority management program 432 is a program for determining the priority of the data migrating process.

The GUI program 433 is a program that displays the information on the storage system 101 and the virtualization device 107 on the monitor 412, and provides an interface to be used for operating the storage management server 102 to an administrator. The details of the interface that is displayed on the monitor 412 by the GUI program 433 will be described with reference to FIG. 15 and FIG. 19. The GUI may be replaced with another interface such as a command line interface.

The table management program 434 is a program that manages a storage table 441 that is stored in the storage device 122, a migration group table 442, a migration plan table 443, a storage tier table 444, a volume table 445, a volume relation table 446, and a priority table 447.

The execution management program 435 is a program that instructs the execution or stop of the migration plan that is configured by the volume migrating process and the data deleting process.

The configuration information acquisition program 436 is a program that acquires the configuration information on the storage system 101, the virtualization device 107, and the host computer 104 through the management network 106.

Also, the storage device 122 stores the storage table 441 (physical configuration information), the migration group table 442 (migration group information), the migration plan table 443 (migration plan information), the storage tier table 444, the volume table 445 (physical configuration information), the volume relation table 446, and the priority table 447. The details of those tables will be described with reference to FIG. 7 to FIG. 13.

FIG. 5 is a diagram showing an example of the data configuration of the storage volume table 241 according to the embodiment of this invention. The storage volume table 241 stores information necessary for reading or writing the data in the volumes by using the controller 111 therein.

The storage volume table 241 includes a VOL#511, a VDEV #512, a RAID level 513, a disk type 514, and a capacity 515. The storage volume table 241 produces a record in each of the volumes.

The VOL #511 is No. for identifying the volumes within the storage system 101. The VDEV #512 is No. for identifying the virtual device to which the storage area on the volume is allocated.

The RAID level 513 is a RAID level of the storage area on the volume. The RAID level 513 may include the drive configuration of the storage device 112. The disk type 514 is a disk type of the storage devices 112 that provide the storage areas on the volumes. The capacity 515 is a storage capacity of the corresponding volume.

FIG. 6 is a diagram showing an example of the external volume table 341 according to the embodiment of this invention. The external volume table 341 stores information necessary for virtualizing the respective storage resources (storage devices 112) provided by the plurality of storage systems 101 by logically recognizing them as one storage resource.

The external volume table 341 associates the VOL #611, the external Port #612, the IP address 613, and the external VOL #614 with each other. In the external volume table 341, a record is produced in each of the produced virtual volumes 321.

The VOL #611 is an identifier for identifying the virtual volume 321 that has been produced in the virtualization device 107.

The external Port #612 is No. for identifying a port (an external association port of the virtualization device 107) for transferring the I/O request with respect to the virtual volume 321 to the external volume from the host computer 104.

The IP address 613 represents the IP address of the storage system 101 having the external volume. The IP address 613 is used for identifying the storage system 101 having the external volume. The information for identifying the storage system 101 having the external volume can be configured by world wide name (WWN).

The external VOL #614 is No. for identifying the external volume within the storage system 101. The external VOL #614 corresponds to the VOL #511 of the storage volume table 241.

FIG. 7 is a diagram showing an example of the storage table 441 according to the embodiment of this invention. The storage table 441 stores information related to the storage system 101 therein.

The storage table 441 includes a storage system ID 711, a storage name 712, and a device type 713. In the storage table 441, a record is produced in each of the storage systems 101.

The storage system ID 711 is an identifier for identifying the storage system 101. The storage name 712 is a name of the storage system.

The device type 713 is the type of storage system 101. The device type 713 stores, for example, a model number of the device therein.

FIG. 8 is a diagram showing an example of the migration group table 423 according to the embodiment of this invention. The migration group table 423 stores information related to the migration group therein.

The volume migration is executed in the group unit that is called "migration group" collectively. When the administrator executes the volume migrating process, the administrator first produces the migration group, and registers the produced migration group in the migration group table 423. Thereafter, the administrator adds the volume that migrates the volume (hereinafter referred to as "migration source volum") to the migration group.

Subsequently, the administrator selects the storage tier (hereinafter referred to as "migration destination storage tier") to which the volume is migrated with respect to the produced migration group. In addition, the administrator selects the volume that belongs to the selected storage tier as the migration destination volume (hereinafter referred to as "migration destination volume") in the respective migration source volumes.

The migration group table 423 includes an MG ID 811, a belonging VOL #812, a migration destination tier 813, and a migration destination tier 814. In the migration group table 423, the record is produced in each of the migration groups.

The MG ID 811 is an identifier for identifying the migration group. The belonging VOL #812 is an identifier of the volume added to the migration group.

The migration destination tier 813 represents information on the storage tier to which the respective volumes of the migration group belong. The storage tier will be described with reference to FIG. 10.

The migration destination tier 814 is an identifier of the storage tier in which the volume that belongs to the migration group is migrated by the migration of the volume. The symbol "-" of the migration destination storage tier 814 indicates that the migration destination storage tier is not designated.

FIG. 9 is a diagram showing an example of the migration plan table 443 according to the embodiment of this invention. The migration plan table 443 stores information related to the volume migrating process in each of the migration groups therein.

The volume migration is executed according to the migration plan in each of the migration groups. The administrator designates the migration destination storage tier and the time at which the migration should be completed in the migration group to execute the volume migration.

The migration plan table 443 includes an MG ID 911, a priority 912, an scheduled start time 913, an scheduled end time 914, and a designated end time 915. In the migration table 443, the record is produced in each of the migration plans.

The MG ID 911 is an identifier for identifying the migration group. The MG ID 911 corresponds to the MG ID 811 of the migration group table 442.

The priority 912 stores the priorities of the respective migration plans. The priority is determined by the data migration management program 121 according to the information on the migration source tier of the migration group, the migration destination tier, and the priority table 447. The priority may be changed by the administrator.

The scheduled start time 913 is an scheduled time at which the migration plan starts to be executed. The processor 413 of the storage management server 102 executes the data migration management program 121, to thereby calculate a required period of time for the data migration on the basis of the configuration information of the migration plan and determine the scheduled start time according to the required period of time and the scheduled end time 914.

The scheduled end time 914 is an scheduled time at which the execution of the migration plan is completed. The scheduled end time 914 is determined on the basis of the priority 912 and the designated end time 915 with the execution of the data migration management program 121. The scheduled start time and the scheduled end time may be changed on the basis of the priority of another migration plan when the another migration plan is registered.

The scheduled end time 915 is a time at which the execution of the migration plan is to be completed. The administrator designates the designated end time at the time of producing the migration plan.

An execution status 916 stores the execution status of the migration plan therein. In the execution status 916 there are stored, for example, "unprocessed", "migrating", "deleting", "suspended", "completed", and "failed".

"Unprocessed" represents that the migration is not yet processed. "Migrating" represents that the volume that belongs to the migration plan is being migrated. "Deleting" represents that the migration of the volume that belongs to the migration plan has been completed, and the data of the migration destination volume is being deleted.

"Suspended" represents that the subject migration group is suspended by the data migration management program 121 in order to migrate another migration group in advance. "Completed" indicates that the migration of the respective volumes of the migration group are migrated, and the deletion of the respective migration source volumes have been completed. "Failed" represents that the data migrating process or the data deleting process of the migration group fails.

FIG. 10 is a diagram showing an example of the storage tier table 444 according to the embodiment of this invention. The storage tier table 444 stores information related to the storage tier therein. The storage tier means the classification of the volumes which is determined on the basis of the characteristics such as the performance and the type.

The storage tier table 444 includes a storage tier ID 1011, a tier name 1012, a tier order 1013, and a tier condition. The tier condition includes a capacity 1014, a device ID 1015, a device type 1016, a RAID level 1017, and a disk type 1018. In the storage tier table 444, the record is produced in each of the storage tiers.

The storage tier ID 1011 is an identifier for identifying the storage tier. The tier name 1012 is a name of the storage tier.

The tier order 1013 is a relative order of the performance of the storage tier. The tier order 1013 is set on the basis of the tier condition when the administrator produces the storage tier. The production of the storage tier will be described with reference to FIG. 16. In addition, the data migration management program 121 is executed, to thereby set the priority in the priority table 447 on the basis of the tier order 1013. This will be described with reference to FIG. 14.

The tier condition is a condition for specifying the storage tier to which the volume belongs. As described above, the tier condition includes the capacity 1014, the device ID 1015, the device type 1016, the RAID level 1017, and the disk type 1018.

Also, the tier condition other than the device type 1016 may be the combination of two or more of those conditions. An item in which the tier condition is not designated is represented by the symbol "-".

The capacity 1014 is a storage capacity necessary to belong to the storage tier. The device ID 1015 is an identifier for identifying the storage system 101. The device type 1016 is a type of the storage system 101. The RAID level 1017 is a RAID level of the storage tier.

The disk type 1018 is a disk type of the storage device 112 that provides the storage area of the storage tier. For example, the disk type of "FC" represents an FC disk. Also, the disk type of "SATA" represents an SATA disk.

FIG. 11 is a diagram showing an example of the volume table 445 according to the embodiment of this invention. The volume table 445 stores the information related to the volume that is supplied by the storage system 101.

The volume table 445 includes a volume ID 1111, an MG ID 1112, a storage ID 1113, a VOL #1114, a RAID level 1115, a disk type 1116, and a capacity 1117. In the volume table 445, a record is produced in each of the volumes.

The volume ID 1111 is an identifier for identifying the volume in the storage system 101 by the host computer 104. The MG ID 1112 is an identifier for identifying the migration group serving as a unit of operating the migrations of the volumes collectively.

The storage ID 1113 is an identifier for identifying the storage system 101. The VOL #1114 is No. for identifying the volume within the storage system 101. The RAID level 1115 is a RAID level of the volume.

The disk type 1116 is the disk type of the storage device 112 which supplies the storage area of the volume. The disk type 1116 is, for example, information for distinguishing the FC disk and the SATA disk from each other. More specifically, the disk type of "FC" indicates the FC disk. Also, the disk type of "SATA" indicates the SATA disk. The capacity 1117 is a storage area of the volume.

FIG. 12 is a diagram showing an example of the volume relation table 446 according to the embodiment of this invention. The volume relation table 446 stores the information related to the progress of the data migrating process of the volume that belongs to the migration group therein.

The volume relation table 446 includes an MG ID 1211, a migration source volume ID 1212, a migration destination volume ID 1213, a capacity 1214, and a progress 1215. In the volume relation table 446, a record is produced in each of the volumes that belong to the migration group.

The MG ID 1211 is an identifier for identifying the migration group to which the migration. source volume belongs. The migration source volume ID 1212 is an identifier for identifying the volume that belongs to the migration group. The migration source volume ID 1212 corresponds to the volume ID 1111 of the volume table 445.

The migration destination volume ID 1213 is an identifier for identifying the volume to which the data of the migration source volume is migrated. The migration destination volume ID 1213 corresponds to the volume ID 1111 of the volume table 445. The capacity 1214 is the capacity of the migration source volume.

The progress 1215 represents the execution status of the volume migration and the date deletion of the migration source volume. The progress 1215 stores, for example, "unprocessed", "migrating", "migration completed", "deleting", "interrupted", and "completed".

"Unprocessed" indicates that the migration of the subject volume is not processed. "Migrating" means that the subject volume is being migrated. "Migration completed" represents that the migration of the subject volume has been completed.

"Deleting" indicates that the migration of the subject volume has been completed, and the data of the migration source volume is being deleted. "Interrupted" indicates a state in which the migration of the subject volume or the data deletion of the migration source volume is suspended.

"Completed" indicates that the migration of the subject volume and the deletion of the migration source volume have been completed. In this situation, the data of the migration source volume may not deleted after the migration of the volume. In this case, the status of "deleting" is not set, and "completed" is set at the time when the migration of the volume is completed.

FIG. 13 is a diagram showing an example of the priority table 447 according to the embodiment of this invention. The priority table 447 stores the priority that is used to determine a process to be prioritized and the condition for allocating the subject priority in the case where the execution timings of the data migrating processes are overlapped with each other, therein.

The priority table 447 includes the condition #1311, a migration condition 1312, a priority 1313, and a condition order 1314. In the priority table 447, a record is produced in each of the conditions (hereinafter referred to as "migration condition") for determining the priority of the data migration. Also, the priority table 447 has a condition that is held as an initial value, and a condition that is produced by the data migration management program 121 when the administrator produces the storage tier. Also, the administrator may register data in the priority table 447.

The condition #1311 is an identifier for identifying the migration condition.

The migration condition 1312 stores the contents of the migration condition therein. The migration condition has a condition that is held as an initial value, and a condition that is produced on the basis of the storage tier table according to the data migration management program 121.

In the migration condition 1312, there is a case in which the capacity of the migration destination storage tier is set as the condition as in a case of a condition #1 "the capacity of the migration source storage tier is 25% or lower at the time of migration". Also, there is a case in which the processing content is set as the condition as in a case of a condition #8 "complete deletion of data in the migration source VOL". Further, there is a case in which the data migration from the migration source storage tier to the migration destination storage tier is set as the condition as in a case of a condition #2 "the data migration from Tier2 to Tier1". Each of Tier1, Tier2, and Tier3 of FIG. 13 is a name of storage tier.

The priority 1313 indicates the priority of the data migrating process on the basis of the migration condition. The data migration is scheduled on the basis of the priority 1313 of the migration plan by executing the data migration management program 121.

The priority 1313 is determined, for example, on the basis of the following rules. The rule is managed by the data migration management program 121. The condition based on the capacity at the time of migration such as the condition #1 is set to the highest priority, and the condition #8 is set to the lowest priority. The lower the numeric value, the higher the priority. Under the condition that is determined according to the migration source storage tier and migration destination storage tier such as the conditions #2 to #7, the priority is higher in the case where the tier order of the migration destination storage tier is higher than the tier order of the migration source storage tier. Further, in the case where the tier order of the migration destination storage tier is highest, the priority is higher. In this case, the priority of the condition in which the tier order of the migration source storage tier is higher is higher.

On the other hand, in the case where the tier order of the migration destination storage tier is lower than the tier order of the migration source storage tier, the priority of the condition in which the tier order of the migration source storage tier is higher is higher. In the case where the tier order of the migration source storage tier is equal to each other, the priority of the condition in which the tier order of the migration destination storage tier is higher is higher.

When the data deleting process is defined separately, as in the case of the condition #8, it is possible to give the priority to the data migrating process and the data deleting process, individually.

When the tier order of the storage tier is set to Tier1, Tier2, and Tier3 in a descending order, the conditions are determined on the basis of the above-mentioned rules as shown in the condition #1 to the condition #8 of FIG. 13.

The condition order 1314 is an order at the time of applying the migration condition. The condition order 1314 is determined by executing the data migration management program 121. For example, in the case where the condition #1 and the condition #2 are satisfied at the same time, that is, in the case where there occurs a status in which the capacity of the Tier2 is equal to or lower than 25% at the time of migrating data from Tier2 to Tier1, the condition #1 that is lower in the value of the condition order is prioritized, and "1" is set in the priority 1313.

Figure 14:
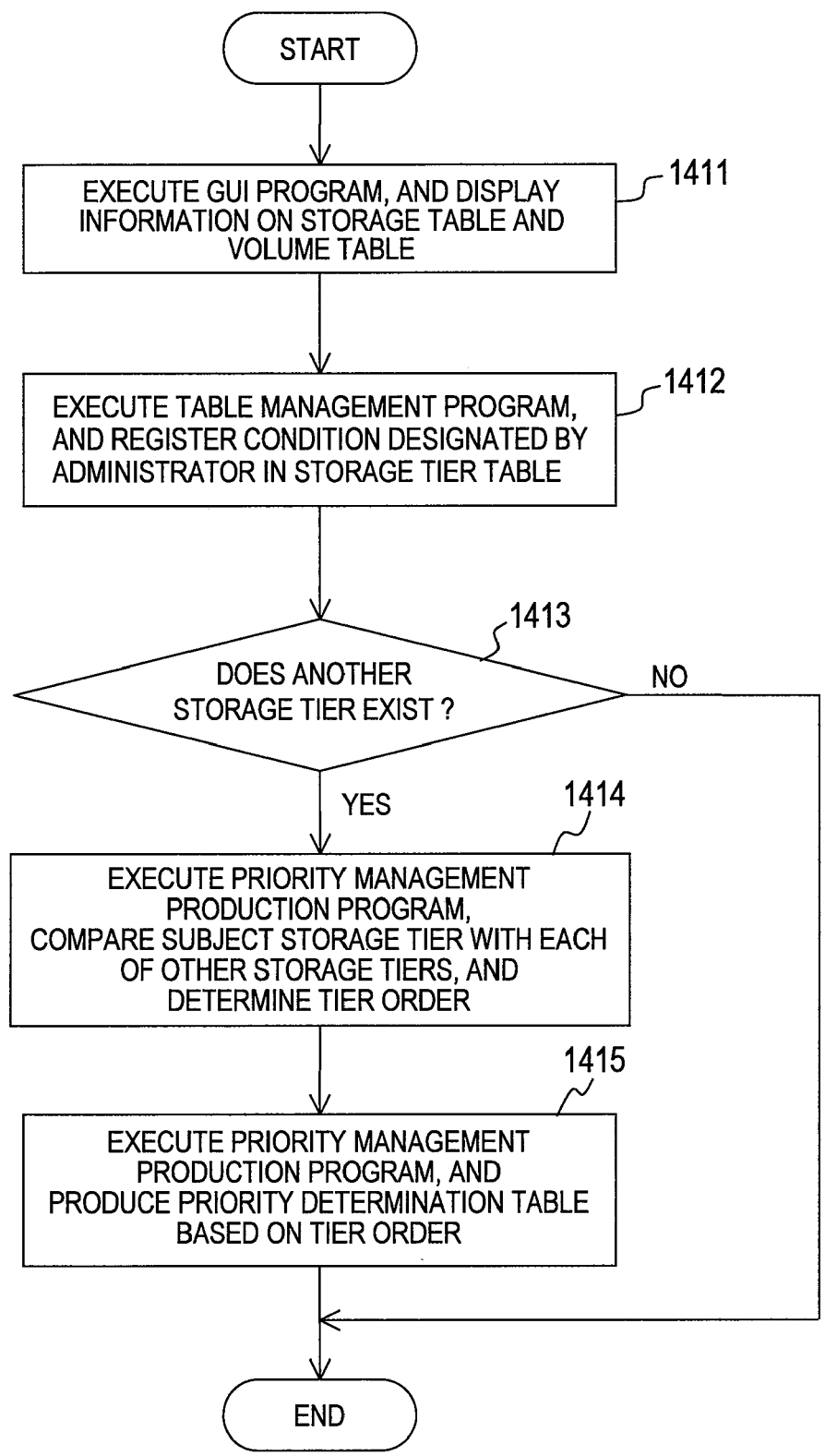
FIG. 14 is a flowchart showing an example of a procedure of producing the storage tier according to the embodiment of this invention.

FIG. 14 is a flowchart showing an example of a procedure of producing the storage tier according to the embodiment of this invention. This processing is appropriately executed by the administrator in the storage management server 102.

First, the processor 413 of the storage management server 102 executes the table management program 434, to thereby acquire the configuration information of the storage system 101 from the storage table 441 and the volume table 445. In addition, the processor 413 executes the GUI program 433, to thereby display the configuration information of the storage device through the web browser 131 of the management client 103 (Step 1411).

Subsequently, the administrator refers to the information that is displayed through the process of Step S1411, produces the storage tier, and registers the produced storage tier in the storage tier table 444 (Step 1412). Hereinafter, a description will be given of a procedure of producing the storage tier with reference to FIG. 15 showing a screen that is displayed by executing the GUI program 433 in order to produce the storage tier.

Figure 15:
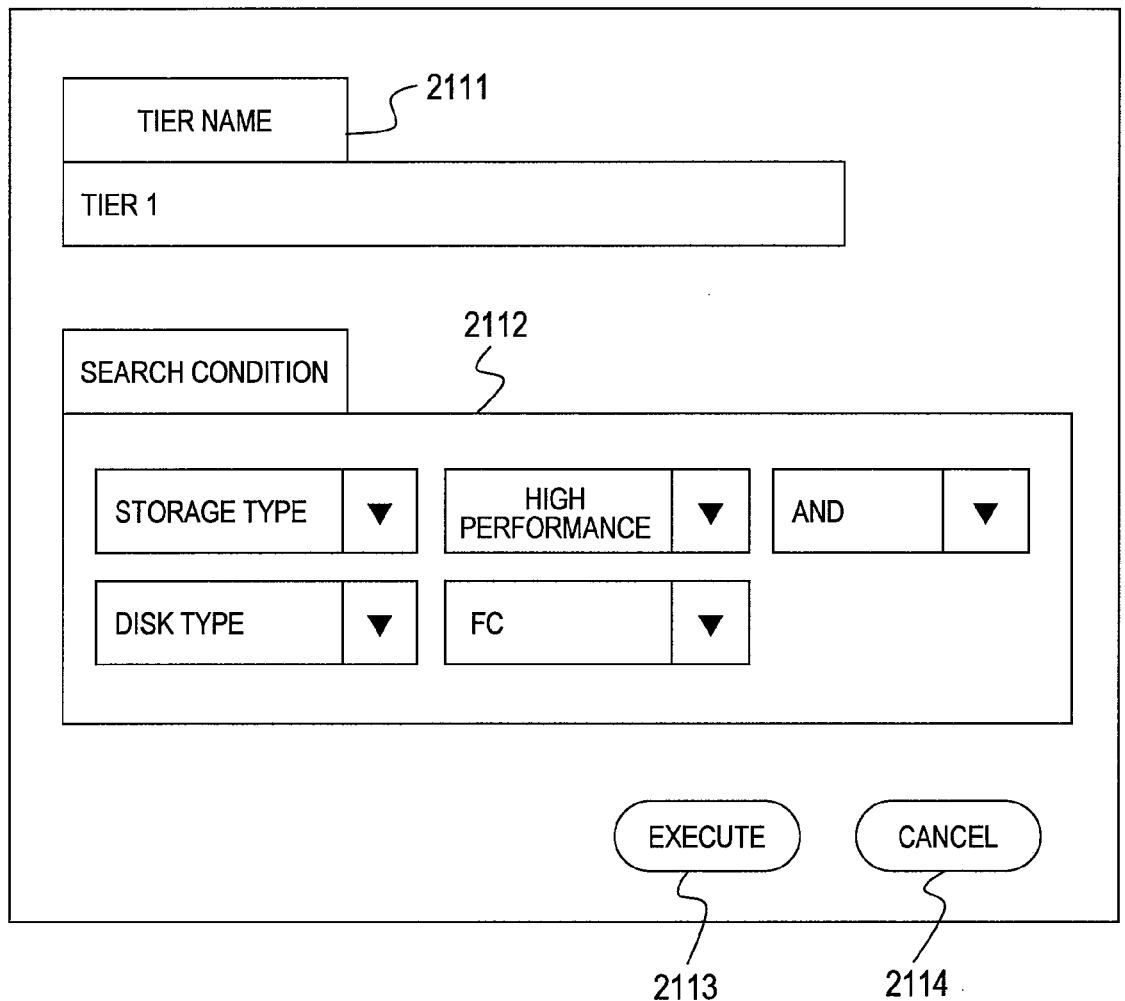
FIG. 15 is a screen for registering a storage tier according to the embodiment of this invention.

FIG. 15 is a screen for registering the storage tier according to the embodiment of this invention.

The administrator first inputs a tier name to a field of the tier name 2111. The administrator then sets the configuration contents in a search condition 2112 on the screen by selecting each content from pull-down, to thereby set the tier condition of the storage tier. Finally, the administrator operates an execute button 2113 in order to register the selected contents. Also, in the case where the administrator does not register the set contents, the manager operates a cancel button 2114 in order to cancel the selected contents.

The information that has been input from the management client 103 is transmitted to the storage management server 102 by operating the execute button 2113. Upon receiving the information that has been input from the management client 103, the processor 413 of the storage management server 102 executes the table management program 434, to thereby register the produced storage tier in the storage tier table 444.

Then, the processor 413 of the storage management server 102 executes the execution management program 435 to search the storage tier table 444 and determine whether another storage tier exists, or not (Step 1413). In the case where another storage tier does not exist (the result in Step 1413 is "no"), processing is completed directly.

On the other hand, in the case where another storage tier exists in the storage tier table 444 (the result in Step 1413 is "yes"), the processor 413 of the storage management server 102 executes the priority management program 432 to compare the received storage tier with the tier condition in each of other storage tiers, and determine the tier order (Step 1414). The procedure of determining the tier order will be described with reference to FIG. 16.

The processor 413 of the storage management server 102 executes the priority management program 432, to thereby produce the priority table 447 on the basis of the tier order that is determined in Step 1414 (Step 1415).

Figure 16:
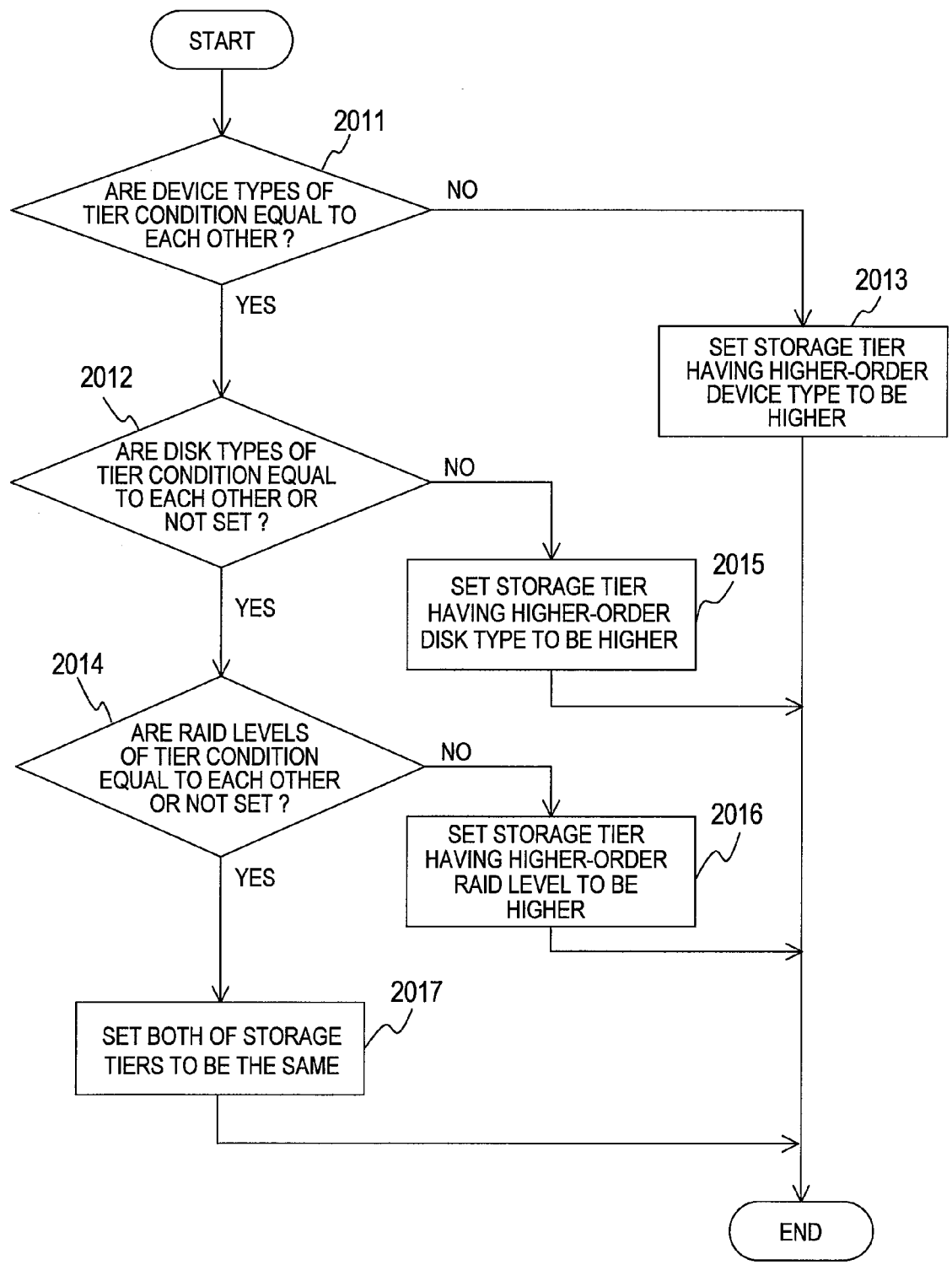
FIG. 16 is a flowchart showing an example of a procedure of determining a tier order of the storage tier table according to the embodiment of this invention.

FIG. 16 is a flowchart showing an example of a procedure of determining the tier order 1013 of the storage tier table 444 according to the embodiment of this invention.

The processor 413 of the storage management server 102 first executes the execution management program 435, to thereby compare the tier condition of the storage tier that has been produced by the process in Step 1412 with the tier condition of the storage tier that has been registered in the storage tier table 444, and determine whether the device type coincides with each other, or not (Step 2011).

In the case where the device type is different from each other (the result in Step 2011 is "no"), the processor 413 of the storage management server 102 sets the storage tier having the higher-order device type to be higher (Step 2013). The higher-order device type means the higher-performance storage system. The storage performance is determined according to the I/O speed of data, the system configuration, and the like. The information for determining which of higher order or lower order the device type is may be held in the storage management server 102 in advance, or may be determined by the administrator.

In the case where the device type coincides with each other (the result in Step 2011 is "yes"), the processor 413 of the storage management server 102 executes the execution management program 435, to thereby compare the disk type of the storage tier produced in the process of Step 1412 with the disk type of the tier condition of the storage tier registered in the storage tier table 444, and determine whether the disk type is equal to each other or not. Alternatively, it is determined that the disk type is not set to at least one of those (Step 2012).

In the case where the device type is different from each other (the result in Step 2012 is "no"), the processor 413 of the storage management server 102 sets the storage tier having the higher-order disk type set to be higher (Step 2015). The higher-order disk type indicates the higher performance disk type. The performance of the disk type is determined according to the I/O speed of data, the lifetime of the disk, and the like. The information for determining which of higher order or lower order the disk type is may be held in the storage management server 102 in advance, or may be determined by the administrator.

In the case where the device type coincides with each other or is not set to at least one of those (the result in Step 2012 is "yes"), the processor 413 of the storage management server 102 executes the execution management program 435, to thereby compare the RAID level of the storage tier produced in the process of Step 1412 with the RAID level of the tier condition of the storage tier registered in the storage tier table 444, and determine whether the RAID level is equal to each other or not. Alternatively, it is determined that the RAID level is not set to at least one of those (Step 2014).

In the case where the RAID level is different from each other (the result in Step 2014 is "no"), the processor 413 of the storage management server 102 sets the storage tier having the higher-order RAID level to be higher (Step 2016). The higher-order RAID level indicates the higher performance RAID level. For example, with respect to fault tolerance, the RAID1 is higher than the RAID5. Therefore, the RAID1 is higher than the RAID5 in view of the fault tolerance. The information for determining whether the RAID level is higher or lower may be held in the storage management server 102 in advance, or may be determined by the administrator.

In the case where the RAID level is equal to each other or not set in at least one of those (the result in Step 2014 is "no"), both of the storage tiers are set to be the same (Step 2017).

Now, a description will be given in more detail of the operation of FIG. 14 and FIG. 16 while comparing the storage tier Tier1 and the storage tier Tier2, and then the storage tier Tier2 with the storage tier Tier3 with reference to FIG. 10.

First, when Tier1 and Tier2 are compared with each other, because Tier1 is of high performance and Tier2 is of low performance, the device type is different therebetween. Accordingly, the result of Step 2011 of FIG. 16 is "no", and Tier1 having the higher-order tier type is defined to have the higher-order storage tier than Tier2 in Step 2013.

Then, when Tier2 and Tier3 are compared with each other, because the device types of Tier2 and Tier3 are equal to each other, the result in Step 2011 is "yes". Then, the disk type is not set in Tier3. Accordingly, the result in Step 2012 is also "yes".

Further, when of the RAID levels of Tier2 and Tier3 are compared with each other, the RAID level of Tier2 is RAID1 and the RAID level of Tier3 is RAID5. In this embodiment, because RAID5 is higher than RAID1, Tier2 is higher than Tier3.

Figure 17:
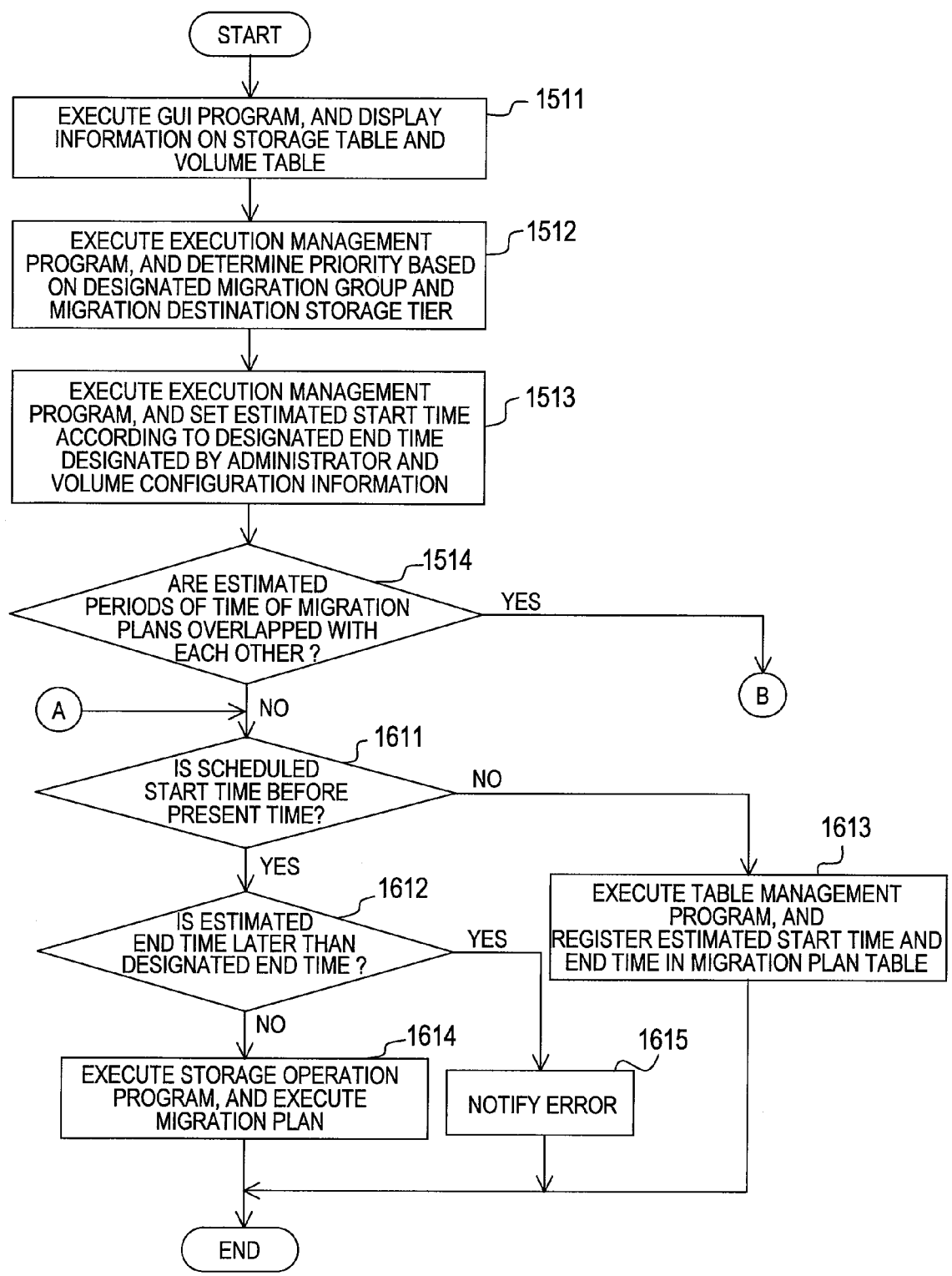
FIG. 17 is a flowchart showing an example of a procedure of producing a migration plan according to the embodiment of this invention.
Figure 18:
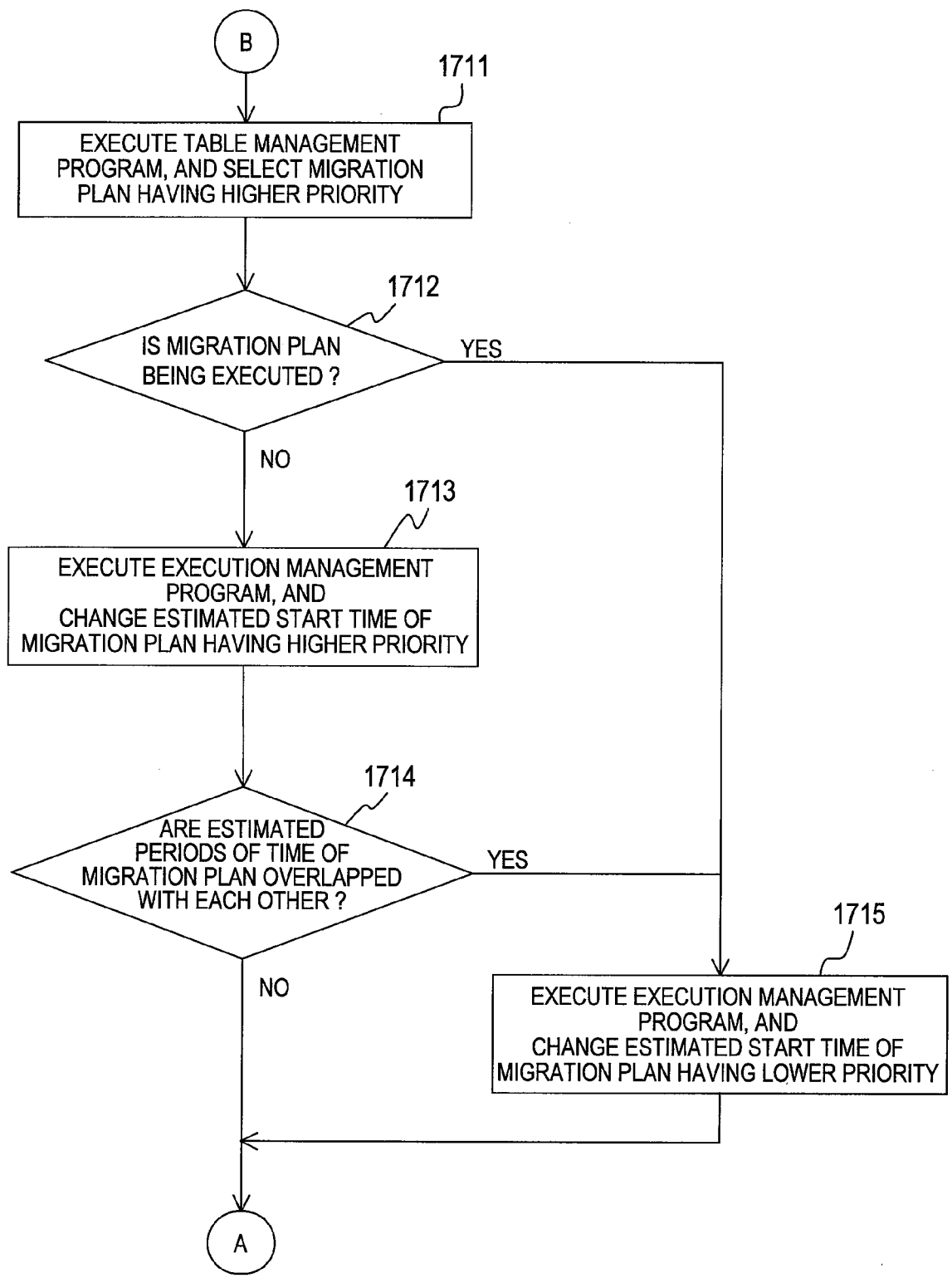
FIG. 18 is a flowchart showing an example of a procedure of producing a migration plan according to the embodiment of this invention.

FIG. 17 and FIG. 18 are flowcharts showing an example of a procedure of producing the migration plan.

FIG. 17 is a flowchart showing an example of a procedure of producing the migration plan according to the embodiment of this invention. The procedure shown in FIG. 17 is a process mainly in the case where the execution of another migration plan is not overlapped with the execution scheduled time of the produced migration plan.

The processor 413 of the storage management server 102 executes the GUI program 433, to thereby display a screen that registers the migration plan through the web browser 131 of the management client 103 (Step 1511). The administrator sets the migration group that migrates data on the displayed screen, the migration destination storage tier, and the designated end time.

Hereinafter, a description will be described of the operation of the administrator in Step 1511 with reference to FIG. 19 showing the screen that is displayed in the web browser 131 of the management client 103.

FIG. 19 shows a screen for registering the migration plan according to the embodiment of this invention.

The administrator first operates a select field 2211 on the basis of information on an MG ID 2212, a belonging VOL #2213, and a migration destination tier 2214 which are displayed on the screen, and selects one migration group. The MG ID 2212, the belonging VOL #2213, and the migration destination tier 2214 correspond to the MG ID 811, the belonging VOL #812, and the migration destination tier 813 in the migration group table 442, respectively.

Subsequently, the administrator operates a select field 2221 on the basis of information on a tier name 2222, a capacity 2223, a device ID 2224, a device type 2225, a RAID level 2226, and a disk type 2227, to thereby select the migration destination storage tier of the volume within the migration group. The tier name 2222, the capacity 2223, the device ID 2224, the device type 2225, the RAID level 2226, and the disk type 2227 correspond to the tier name 1012, the capacity 1014, the device ID 1015, the device type 1016, the RAID level 1017, and the disk type 1018 in the storage tier table 444, respectively.

In addition, the administrator inputs a designated end time 2231. Finally, in order to execute the selected contents, the manager operates an execute button 2241. In the case where the selected contents are canceled, the administrator operates a cancel button 2242.

Subsequently, the processor 413 of the storage management server 102 executes the execution management program 435, to thereby searches the priority table 447 for the subject priority on the basis of information on the migration group designated by the administrator, and the migration destination storage tier (Step 1512).

The processor 413 of the storage management server 102 executes the execution management program 435, to thereby calculate a period of time required for the data migration which is designated by the administrator. In the calculation of the period of time required for the data migration, for example, a sum of capacities of the volumes that belong to the migration group is calculated based on the configuration information of the volumes that belong to the migration group, and a product of the sum and the data transfer speed per unit capacity is obtained. The data transfer speed per unit capacity is held by the storage management server 102 in advance. The configuration information of the volume is acquired from the migration group table 442 and the volume table 445.

Subsequently, the processor 413 of the storage management server 102 sets an scheduled end time. The scheduled end time is a time obtained by subtracting a constant time (hereinafter referred to as "margin time") from the designated end time designated by the administrator. The margin time is held by the storage management server 102 in advance. The processor 413 of the storage management server 102 sets an scheduled start time on the basis of the scheduled end time and the required period of time (Step 1513).

The processor 413 of the storage management server 102 executes the table management program 434, to thereby acquire the registered migration plan from the migration plan table 443. In addition, the processor 413 of the storage management server 102 acquires the scheduled start time and the scheduled end time (hereinafter, a period of time between the scheduled start time and the scheduled end time will be called "scheduled period of time") of the acquired migration plan, and determines whether the scheduled period of time that is set in the process of Step 1513 is overlapped with the scheduled period of time of another migration plan, or not (Step 1514).

In the case where the scheduled period of time is not overlapped with that of other migration plans (the result in Step 1514 is "no"), the processor 413 of the storage management server 102 executes the execution management program 435, to thereby determine whether the scheduled start time is before the present time, or not (Step 1611). More specifically, the processor 413 compares the scheduled start time that has been set in the process of Step 1512 with the present time.

In the case where the scheduled start time is before the present time (the result in Step 1611 is "no"), the processor 413 of the storage management server 102 executes the table management program 434, to thereby register the information in the migration plan table 443 (Step 1613). The information to be registered in the migration plan table 443 is information set in the processes of Steps 1511 and 1512 and information designated by the administrator.

In the case where the scheduled start time is not before the present time (the result in Step 1611 is "yes"), the processor 413 of the storage management server 102 executes the execution management program 435, to thereby determine whether the scheduled end time is later than the designated end time, or not (Step 1612). More specifically, the processor 413 compares the scheduled end time set in the process of Step 1512 with the designated end time designated by the administrator.

In the case where the scheduled end time is earlier than the designated end time (the result in Step 1612 is "no"), the processor 413 of the storage management server 102 executes the storage operation program 431, to thereby instruct the data migration to the storage system 101 (Step 1614). In this situation, the processor 413 of the storage management server 102 designates the migration source volume and the migration destination volume which are described in the volume relation table 446 from the migration plan to the storage system 101.

In the case where the scheduled end time is later than the designated end time (the result in Step 1612 is "yes"), the processor 413 of the storage management server 102 notifies the administrator of the error (Step 1615).

The above process is a process in the case where the execution of another migration plan is not overlapped with the execution scheduled time of the produced migration plan. Hereinafter, a description will be given of the process in the case where the execution of another migration plan is overlapped with the execution scheduled time of the produced migration plan with reference to FIG. 18.

FIG. 18 is a flowchart showing an example of the procedure of producing the migration plan according to the embodiment of this invention. Specifically, a case in which the execution of another migration plan is overlapped with the execution scheduled time of the produced migration plan is illustrated.

In the case where the scheduled period of time is overlapped with each other (the result in Step 1514 of FIG. 17 is "yes"), the processor 413 of the storage management server 102 executes the execution management program 435, to thereby select the migration plan having a higher priority (Step 1711). More specifically, the processor 413 compares the priority of the overlapped migration plan with the priority set in the process of Step 1511. In this situation, in the case where the priorities are equal to each other, the processor 413 selects the overlapped migration plan.

Subsequently, the processor 413 of the storage management server 102 executes the execution management program 435, to thereby determine whether the migration plan that has been selected in the process of Step 1711 is being executed, or not (Step 1712).

In the case where the migration plan is in execution (the result in Step 1712 is "yes"), the processor 413 of the storage management server 102 executes the execution management program 435, to thereby delay the scheduled start time of the migration plan not selected in the process of Step 1711 so that those executions are not overlapped with each other (Step 1715).

In the case where the migration plan selected in the process of Step 1711 is not in execution (the result in Step 1712 is "no"), the processor 413 of the storage management server 102 executes the execution management program 435, to thereby hasten the scheduled start time of the migration plan selected in the process of Step 1711. More specifically, the processor 413 hastens the scheduled start time of the migration plan selected in the process of Step 1711 as much as the period of time between the scheduled start time and the present time, as much as the period of time between the scheduled end time and the present time, to the scheduled end time of another migration plan, or to the latest time among the times corresponding to the periods of time, the scheduled end time, and the present time, on the basis of the information on the migration plan other than the migration plan compared in the process of Step 1711 and the information on the present time (Step 1713).

The processor 413 of the storage management server 102 may not change the scheduled start time according to the scheduled end time of another migration plan, but may execute the process of FIG. 18 with respect to the migration plan selected in the process of Step 1711 and the migration plan whose scheduled end time competes against the scheduled end time thereof in this step.

Subsequently, the processor 413 of the storage management server 102 executes the execution management program 435, to thereby compare the scheduled period of time changed in the process of Step 1713 with the scheduled period of time of another migration plan compared in the process of Step 1711, and determine whether the scheduled period of time is overlapped with each other, or not (Step 1714).

In the case where the scheduled period of time is overlapped with each other (the result in Step 1714 is "yes"), the processor 413 of the storage management server 102 executes a process of Step 1715.

In the case where the scheduled period of time is not overlapped with each other (the result in Step 1714 is "no"), the processor 413 of the storage management server 102 executes the processes after Step 1611 with respect to the respective migration groups whose scheduled period of time has been changed.

Now, a process of producing the migration plan will be described with reference to an example of FIG. 20.

Figure 20:
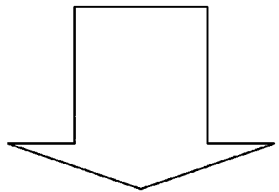
FIG. 20 is a diagram for explaining a specific example of a procedure of producing the migration plan according to the embodiment of this invention.

FIG. 20 is a diagram for explaining a specific example of a procedure of producing the migration plan according to the embodiment of this invention.

In the migration plan table before producing the migration plan, there is registered a migration plan whose MG ID 911 is "101".

The administrator executes the processes of Steps 1511 to 1513 to register a migration plan whose designated end time is "12/10 12:00", the scheduled start time is "12/10 9:00", the scheduled end time is "12/10 10:00", and the priority is "5", at the present time "12/10 9:00". The MG ID of the migration plan is set to "102", and the scheduled start time 913, the scheduled end time 914, and the priority 912 are determined by the execution of the execution management program 435.

Subsequently, the processor 413 of the storage management server 102 determines whether the scheduled period of time of the migration plan whose MG ID is "101" is overlapped with the scheduled period of time of the migration plan whose MG ID is "102", or not, through the process of Step 1514.

The migration plan whose MG ID is "101" has the scheduled start time of "12/10 9:00" and the scheduled end time of "12/10 10:00". The migration plan whose MG ID is "102" has the scheduled start time of "12/10 9:30", and the scheduled end time of "12/10 10:00". Thus, the scheduled periods of time of those migration plans are overlapped with each other.

Accordingly, because the result of Step 1514 is "yes", the processor 413 of the storage management server 102 executes the process of Step 1711. In the process of Step 1711, the table management program 232 is executed, and the migration plan whose MG ID is "101" that is higher in the priority is selected.

The processor 413 of the storage management server 102 determines whether the migration plan having the MG ID of "101" is being executed, or not, through the process of Step 1712. Because the migration plan having the MG ID of "101" is unprocessed, the processor 413 executes the process of Step 1713. As a result, the scheduled start time of the migration plan having the MG ID of "101" is hastened up to 9:00 which is the present time. In this situation, the scheduled start time of the migration plan having the MG ID of "101" is "9:00", and the scheduled end time thereof is "9:30".

Subsequently, the processor 413 of the storage management server 102 determines whether the scheduled periods of time of the migration plan having the MG ID of "101" and that of the migration plan whose MG ID of "102" are overlapped with each other, or not, through a process of Step 1714.

The processor 413 of the storage management server 102 executes a process of Step 1715 because the scheduled periods of time of the migration plan having the MG ID of "101" and that of the migration plan whose MG ID of "102" are overlapped with each other. The processor 413 of the storage management server 102 changes the scheduled start time and the scheduled end time of the migration plan having the MG ID of "102" to "9:30" and "10:30", respectively, so as not to be overlapped with the scheduled period of time of the migration plan having the MG ID of "101".

In addition, the processor 413 of the storage management server 102 executes the processes after Step 1611 of FIG. 17 with respect to the migration plans having the MG ID of "101" and the MG ID of "102", respectively.

The processor 413 of the storage management server 102 executes the process of Step 1611 to determine whether the scheduled start time of the migration plan having the MG ID of "101" is before the present time, or not.

Because the scheduled start time of the migration plan having the MG ID of "101" is not before the present time, the processor 413 of the storage management server 102 executes the process of Step 1612 to determine whether the scheduled end time is before the designated end time, or not. In addition, the processor 413 executes the process of Step 1614, and executes the migration plan having the MG ID of "101".

On the other hand, because the scheduled start time of the migration plan having the MG ID of "102" is not before the present time, the processor 413 executes the process of Step 1613, and registers the scheduled start time and the scheduled end time in the migration plan table 443.

Figure 21:
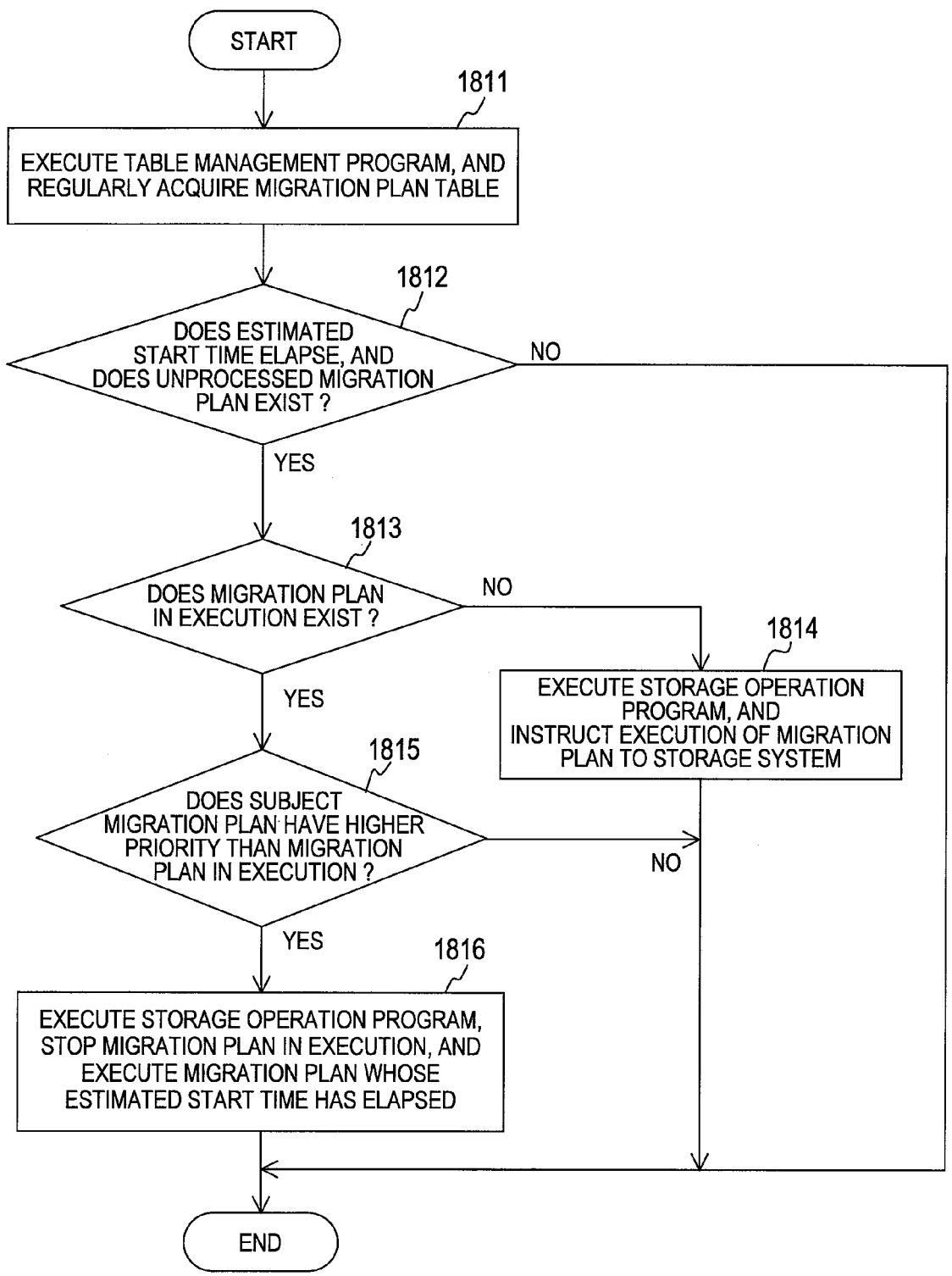
FIG. 21 is a flowchart showing a procedure of a volume migrating process registered in the migration plan according to the embodiment of this invention.

FIG. 21 is a flowchart showing a procedure of the volume migrating process registered in the migration plan according to the embodiment of this invention.

The processor 413 of the storage management server 102 executes the table management program 434, to thereby regularly acquire the migration plan table 443 (Step 1811).

The processor 413 of the storage management server 102 executes the execution management program 435, to thereby retrieve the scheduled start time of the migration plan acquired in the process of Step 1811, and determine whether the scheduled start time has passed, or not, and whether the unprocessed migration plan exists, or not (Step 1812).

In the case where the scheduled start time has passed, and the unprocessed migration plan does not exist (the result in Step 1812 is "no"), the processor 413 of the storage management server 102 terminates this process.

In the case where the scheduled start time has passed, and the unprocessed migration plan exists (the result in Step 1812 is "yes"), the processor 413 of the storage management server 102 executes the execution management program 425, to thereby determine whether the migration plan in execution exists, or not (Step 1813). More specifically, the processor 413 refers to the execution status of the migration plan acquired in the process of Step 1811 for determination.

In the case where the migration plan in execution does not exist (the result in Step 1813 is "no"), the processor 413 of the storage management server 102 executes the storage operation program 431, to thereby instruct the data migration to the storage system 101 (Step 1814). In this situation, the processor 413 of the storage management server 102 designates the migration source volume and the migration destination volume, which are described in the volume relation table 446, from the migration plan having the scheduled start time passed.

In the case where the migration plan in execution exists (the result in Step 1813 is "yes"), the processor 413 of the storage management server 102 executes the execution management program 435, to thereby compare the priority of the migration plan in execution with the priority of the migration plan having the scheduled start time passed, and determine whether the priority of the migration plan having the scheduled start time passed is higher, or not (Step 1815).

In the case where the priority of the migration plan having the scheduled start time passed is higher (the result in Step 1815 is "yes"), the processor 413 of the storage management server 102 executes the storage operation program 431, to thereby suspend the data migrating process of the migration plan in execution. Then, the processor 413 designates the migration source volume and the migration destination volume, which are described in the volume relation table 446, from the migration plan having the scheduled start time passed, and instructs the data migration to the storage system 101 (Step 1816). The stopped process is again executed in a case where the migration plan that is higher in priority does not executed.

Figure 22:
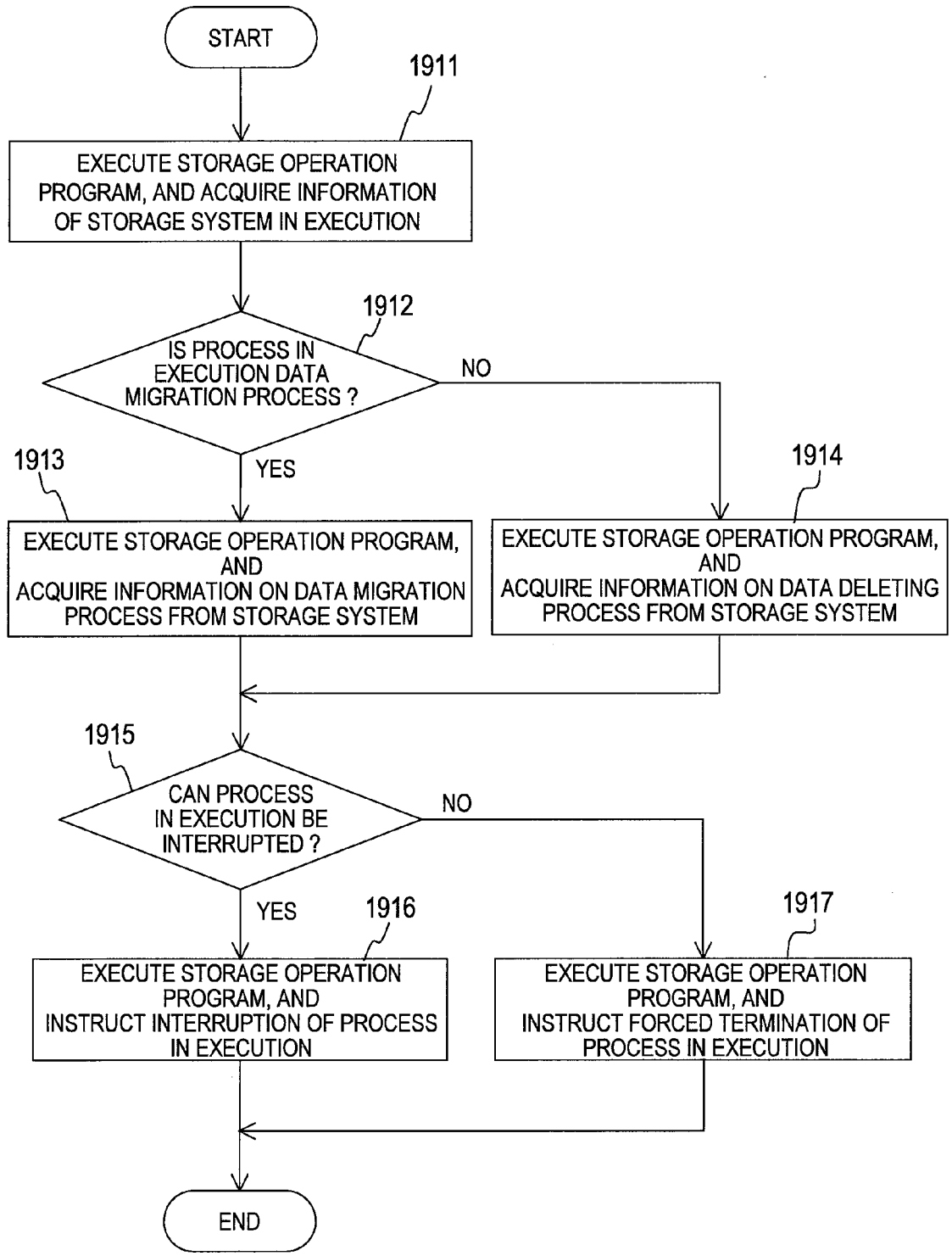
FIG. 22 is an example of a flowchart that instructs a stop of a data migrating process of the storage system according to the embodiment of this invention.

FIG. 22 is an example of a flowchart that instructs the stop of the data migrating process of the storage system 101 according to the embodiment of this invention. This process represents the stop of the data migrating process in the process of Step 1816 shown in FIG. 18.

The processor 413 of the storage management server 102 executes the storage operation program 431, to thereby access to the storage system 101 and acquire the information on the process that stops (Step 1911).

The processor 413 of the storage management server 102 executes the execution management program 435, to thereby determine whether the process in execution is the data migrating process, or the data deleting process (Step 1912).

In the case where the process in execution is the data deleting process (the result in Step 1912 is "no"), the processor 413 of the storage management server 102 executes the storage operation program 431, to thereby acquire information on the subject storage device (Step 1914). In addition, the processor 413 of the storage management server 102 determines whether the interruption of the data deleting process is enabled, or not (Step 1915).

The interruption of the process means that the subject process is suspended when the storage operation program 431 is executed to transmit a stop command of the subject process to the storage system 101, and the suspended process is restarted when the storage operation program 431 is executed to transmit the restart command of the subject process to the storage system 101.

In the case where the process in execution is the data migrating process (the result in Step 1912 is "yes"), the processor 413 of the storage management server 102 executes the storage operation program 431, to thereby acquire the information on the subject storage device (Step 1913). In addition, the processor 413 of the storage management server 102 determines whether the interruption of the data migrating process is enabled, or not (Step 1915).

In the case where the process in execution can be interrupted (the result in Step 1915 is "yes"), the processor 413 of the storage management server 102 executes the storage operation program 431, to thereby instruct the interruption of the present process to the storage system 101 (Step 1916).

In the case where the process in execution cannot be interrupted (the result in Step 1915 is "no"), the processor 413 of the storage management server 102 executes the storage operation program, to thereby instruct the forced termination of the present process to the storage system 101 (Step 1917). Further, in the subject process, the processor 413 updates the progress 1215 of the volume relation table 446. For example, when the value of the progress 1215 is "migrating", the processor 413 changes the value to "unprocessed", and when the value of the progress 1215 is "deleting", the processor 413 changes the value to "migrating".

The forced termination of the process means that the processor 413 executes the storage operation program 431, thereby transmitting the forced termination command of the subject process to the storage system 101 to cancel the subject process. In this situation, in order to restart the process, the processor 413 of the storage management server 102 is required to execute the storage operation program 431 to again transmit the execution command of the subject process. In this situation, the subject process is executed from the beginning.

Figure 23:
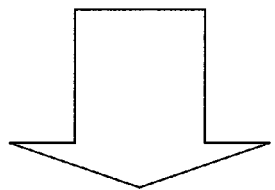
FIG. 23 is a diagram for explaining a specific example of a procedure of executing a migration plan according to the embodiment of this invention.

FIG. 23 is a diagram for explaining a specific example of a procedure of executing the migration plan according to the embodiment of this invention.

In the migration plan table before execution shown in FIG. 23, the migration plan having the MG ID of "201" is "migrating", and the migration plan having the MG ID of "202" is "unprocessed".

A description will be given of a case in which the execution of the migration plan having the MG ID of "201" is not completed, and the scheduled start time of the migration plan having the MG ID of "202" has passed (in the case where the result of Step 1812 is "yes").

In this case, because the migration plan having the MG ID of "201" is in execution, the processor 413 executes the process of Step 1815 to compare the priority of the migration plan having the MG ID of "201" with the priority of the migration plan having the MG ID of "202". As a result, because the priority of the migration plan having the MG ID of "202" is higher, the migration plan having the MG ID of "201" is suspended, and the migration plan having the MG ID of "202" is executed. In this situation, the migration plan table 443 is in a state of the migration plan table after execution shown in FIG. 23.

According to the embodiment of this invention, it is possible to start the volume migration that is higher in priority such that the process completes before the end time. Therefore, the migrating process of the volume that is higher in priority can be completed by the designated time.

Also, according to the embodiment of this invention, in the case where a timing at which the access frequency is increased is grasped by a system monitor and the like in advance, it is possible to complete the migrating process of the volume before the processing performance is deteriorated due to increased access frequency.

In the embodiment of this invention, the data migration is executed by the virtualization device 107 in a state where a plurality of storage devices are logically identified as one storage device. Now, a description will be given of a modified example in which the data migration is conducted in the interior of one storage system.

More specifically, the modified example is different from the computer system 100 shown in FIG. 1 in that the virtualization device 107 is not included, and the storage management server 102 manages one storage system 101. Other structures are the same as those in FIG. 1.

The processor 413 of the storage management server 102 executes the storage operation program 431, to thereby transmit instructions of the data migrating process and the data deleting process to the storage system 101.

According to the modified example of the embodiment of this invention, it is possible to apply this invention to the configuration in which one storage system 101 is disposed for the storage management server 102. Accordingly, even in a computer system that is relatively small-scaled, it is possible to complete the migrating process of the volume before the access frequency increases, by means of the system monitor.

While the present invention has been described in detail and pictorially in the accompanying drawings, the present invention is not limited to such detail but covers various obvious modifications and equivalent arrangements, which fall within the purview of the appended claims.

What is claimed is:

1. A computer system, comprising:
    a storage system;
    a host computer that is coupled to the storage system via a network; and
    a storage management server that can access to the storage system and the host computer,
    wherein the storage system comprises a first interface that is coupled to the network, a first processor that is coupled to the first interface, a first memory that is coupled to the first processor, and a storage device that stores data that is read or written by the host computer, and provides at least one storage area of the storage device for the host computer as at least one volume,
    wherein the storage management server comprises a second interface that is coupled to the storage system, a second processor that is coupled to the second interface, and a second memory that is coupled to the second processor,
    wherein the second memory stores configuration information of the volume, and
    wherein the second processor executes a volume migrating process for migrating data stored in the volume to another volume, in which the second processor:
    calculates a required period of time for migrating the data based on a size of data to be migrated, volume configuration information of a first volume in which the data to be migrated is stored, and volume configuration information of a second volume that is a volume to which the data is migrated;
    generate a volume migration plan by determining a start time at which the data migration starts based on the calculated required period of time and an input end time;
    sets a priority of the generated volume migration plan; and
    changes, in a case where a period of time during which the produced volume migration plan is executed and a period of time during which an existing volume migration plan is executed are overlapped with each other, based on a result of comparing a priority of the generated volume migration plan with a priority of the existing volume migration plan, the start time of at least one of the generated volume migration plan and the existing volume migration plan, in accordance with the priority of the volume migration plan which has a higher priority of the generated volume migration plan and the existing volume migration plan.

2. The computer system according to claim 1, wherein the second processor hastens a start time of the volume migration plan having a higher priority.

3. The computer system according to claim 1, wherein the second processor delays a start time of a volume migration plan having a lower priority.

4. The computer system according to claim 1, wherein the priority is determined based on the volume configuration information of the first volume and the volume configuration information of the second volume.

5. The computer system according to claim 1,
wherein the volume migrating process further comprises:
instructing the storage system a first process of writing the data stored in the first volume into the second volume; and
instructing the storage system a second process of deleting the data stored in the first volume after the completion of the first process, and
wherein the priority is set in the first process and the second process, individually.

6. The computer system according to claim 1,
wherein the storage system executes, in accordance with an instruction sent from the storage management server, a data writing process of writing the data stored in the source volume into the destination volume and a data deleting process of deleting the data stored in the source volume, and
wherein the second processor compares, in a case where a first volume migration plan in which at least one of the data writing process and the data deleting process is being executed and a second volume migration plan in which any of the data writing process and the data deleting process is not executed are registered, when a start time of the second volume migrating plan comes during processing of the first volume migrating plan, a priority of the first volume migration plan with a priority of the second volume migration plan to execute the volume migration plan having a higher priority.

7. The computer system according to claim 6, wherein the second processor suspends, in a case where the priority of the first volume migration plan is lower than the priority of the second volume migration plan, the processing of the first volume migration plan, and executes the second volume migration plan.

8. The computer system according to claim 1, wherein the second processor generates display data of a screen on which selection of the first volume, selection of the second volume, and the end time of the process of migrating the data from the selected first volume to the selected second volume are input, and generates the volume migration plan based on the selected first volume, the selected second volume, and the input end time.

9. A storage management server that is coupled to a storage system having a storage device that stores data therein, the storage management server comprising:
an interface coupled to the storage system;
a processor coupled to the interface; and
a memory coupled to the second processor,
wherein the storage system provides at least one storage area of the storage device for a host computer as at least one volume,
wherein the memory stores configuration information of the volume,
wherein the processor executes a volume migrating process for migrating data stored in the volume to another volume, in which the processor:
calculates a required period of time for migrating the data based on a size of data to be migrated, volume configuration information of a first volume in which the data to be migrated is stored, and volume configuration information of a second volume that is a volume to which the data is migrated;
generate a volume migration plan by determining a start time at which the data migration starts based on the calculated required period of time and an input end time;
sets a priority of the generated volume migration plan; and
changes, in a case where a period of time during which the produced volume migration plan is executed and a period of time during which an existing volume migration plan is executed are overlapped with each other, based on a result of comparing a priority of the generated volume migration plan with a priority of the existing volume migration plan, the start time of at least one of the generated volume migration plan and the existing volume migration plan, in accordance with the priority of the volume migration plan which has a higher priority of the generated volume migration plan and the existing volume migration plan.

10. The storage management server according to claim 9, wherein the processor hastens a start time of the volume migration plan having a higher priority.

11. The storage management server according to 9, wherein the processor delays a start time of a volume migration plan having a lower priority.

12. The storage management server according to claim 9, wherein the priority is determined based on the volume configuration information of the first volume and the volume configuration information of the second volume.

13. The storage management server according to claim 9,
wherein the volume migrating process further comprises:
a first process of writing the data stored in the first volume into the second volume; and
a second process of deleting the data stored in the first volume after the completion of the first process, and
wherein the priority is set in the first process and the second process, individually.

14. The storage management server according to claim 9,
wherein the volume migrating process further comprises a data writing process of writing the data stored in the source volume into the destination volume and a data deleting process of deleting the data stored in the source volume, and
wherein the processor compares, in a case where a first volume migration plan in which at least one of the data writing process and the data deleting process is being executed and a second volume migration plan in which the volume migrating process is not executed are registered, when a start time of the second volume migrating plan comes during processing of the first volume migrating plan, a priority of the first volume migration plan with a priority of the second volume migration plan to execute the volume migration plan having a higher priority.

15. The storage management server according to claim 14, wherein the processor suspends, in a case where the priority of the first volume migration plan is lower than the priority of the second volume migration plan, the processing of the first volume migration plan, and executes the second volume migration plan.

16. The storage management server according to claim 9, wherein the processor generate display data of a screen on which selection of the first volume, selection of the second volume, and the end time of the process of migrating the data from the selected first volume to the selected second volume are input, and generate the volume migration plan based on the selected first volume, the selected second volume, and the input end time.

17. A data migrating method in a computer system including a storage system, a host computer that is coupled to the storage system via a network, and a storage management server that can access to the storage system and the host computer, wherein the storage system comprises a first interface that is coupled to the network, a first processor that is coupled to the first interface, a first memory that is coupled to the first processor, and a storage device that stores data that is read or written by the host computer, and provides at least one storage area of the storage device for the host computer as at least one volume, wherein the storage management server comprises a second interface that is coupled to the storage system, a second processor that is coupled to the second interface, and a second memory that is coupled to the second processor, and wherein the second memory stores configuration information of the volume, the data migrating method comprising the steps of:

calculating, by the second processor, a required period of time for migrating the data based on a size of data to be migrated, volume configuration information of a first volume in which the data to be migrated is stored, and volume configuration information of a second volume that is a volume to which the data is migrated;

generating a volume migration plan by determining, by the second processor, a start time at which the data migration starts based on the calculated required period of time and an input end time;

setting, by the second processor, a priority of the generated volume migration plan; and changing, by the second processor, in a case where a period of time during which the produced volume migration plan is executed and a period of time during which an existing volume migration plan is executed are overlapped with each other, based on a result of comparing a priority of the generated volume migration plan with a priority of the existing volume migration plan, the start time of at least one of the generated volume migration plan and the existing volume migration plan, priority of the volume migration plan which has a higher priority of the generated volume migration plan and the existing volume migration plan.

18. The data migrating method according to claim 17, further comprising, in the step of changing the start time, hastening a start time of the volume migration plan having higher priority.

19. The data migrating method according to claim 17, further comprising, in the step of changing the start time, delaying a start time of a volume migration plan having lower priority.

20. The data migrating method according to claim 17, wherein the storage system executes, in accordance with an instruction sent from the storage management server, a data writing process of writing the data stored in the source volume into the destination volume and a data deleting process of deleting the data stored in the source volume, and the data migrating method further comprising the steps of:

suspending, by the second processor, in a case where a first volume migration plan in which at least one of the data writing process and the data deleting process is being executed and a second volume migration plan in which any of the data writing process and the data deleting process is not executed are registered, when a start time of the second volume migrating plan comes during processing of the first volume migrating plan having a lower priority than a priority of the second volume migration plan, the processing of the first volume migration plan; and executing, by the second processor, the second volume migration plan.

\* \* \* \* \*